(12) United States Patent
ElBsat et al.

(10) Patent No.: US 11,010,846 B2
(45) Date of Patent: May 18, 2021

(54) BUILDING ENERGY STORAGE SYSTEM WITH MULTIPLE DEMAND CHARGE COST OPTIMIZATION

(71) Applicant: Johnson Controls Technology Company, Auburn Hills, MI (US)

(72) Inventors: Mohammad N. ElBsat, Milwaukee, WI (US); Michael J. Wenzel, Grafton, WI (US); Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/352,612

(22) Filed: Mar. 13, 2019

(65) Prior Publication Data

US 2019/0206000 A1 Jul. 4, 2019

Related U.S. Application Data

(63) Continuation-in-part of application No. 15/405,236, filed on Jan. 12, 2017, now Pat. No. 10,282,796, and
(Continued)

(51) Int. Cl.
*G06Q 50/06* (2012.01)
*G05B 13/04* (2006.01)
(Continued)

(52) U.S. Cl.
CPC ........... *G06Q 50/06* (2013.01); *G05B 13/041* (2013.01); *G06Q 10/06315* (2013.01);
(Continued)

(58) Field of Classification Search
CPC .............................. G05B 13/041; H02J 3/003
See application file for complete search history.

(56) References Cited

U.S. PATENT DOCUMENTS 7,062,361 B1   6/2006  Lane
7,457,762 B2  11/2008  Wetzer et al.
(Continued)

FOREIGN PATENT DOCUMENTS

EP    3 088 972 A2   11/2016
JP    2001-357112    12/2001
(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.
(Continued)

*Primary Examiner* — Nathan L Laughlin
(74) *Attorney, Agent, or Firm* — Foley & Lardner LLP

(57) ABSTRACT

A building energy system includes a controller configured to obtain representative loads and rates for a plurality of scenarios and generate a cost function comprising a risk attribute and multiple demand charges. Each of the demand charges corresponds to a demand charge period and defines a cost based on a maximum amount of at least one of the energy resources purchased within the corresponding demand charge period. The controller is configured to determine, for each of the multiple demand charges, a peak demand target for the corresponding demand charge period by performing a first optimization of the risk attribute over the plurality of the scenarios, allocate an amount of the one or more energy resources to be consumed, produced, stored, or discharged by the building equipment by performing a second optimization subject to one or more constraints based on the peak demand target for each of the multiple demand charges.

20 Claims, 16 Drawing Sheets

Related U.S. Application Data a continuation-in-part of application No. 16/115,290, filed on Aug. 28, 2018.

(60) Provisional application No. 62/558,135, filed on Sep. 13, 2017.

(51) Int. Cl.
   *H02J 3/14* (2006.01)
   *G06Q 10/06* (2012.01)
   *H02J 3/32* (2006.01)
   *H02J 13/00* (2006.01)
   *H02J 3/38* (2006.01)
   *H02J 3/00* (2006.01)

(52) U.S. Cl.
   CPC ........ *H02J 3/14* (2013.01); *H02J 3/32* (2013.01); *H02J 13/0006* (2013.01); *H02J 3/003* (2020.01); *H02J 3/383* (2013.01); *H02J 2203/20* (2020.01); *H02J 2310/64* (2020.01)

(56) References Cited

U.S. PATENT DOCUMENTS

| | | |
|---|---|---|
| 7,580,775 B2 | 8/2009 | Kulyk et al. |
| 7,894,946 B2 | 2/2011 | Kulyk et al. |
| 8,126,574 B2 | 2/2012 | Discenzo et al. |
| 8,396,571 B2 | 3/2013 | Costiner et al. |
| 8,527,108 B2 | 9/2013 | Kulyk et al. |
| 8,527,109 B2 | 9/2013 | Kulyk et al. |
| 8,880,962 B2 | 11/2014 | Hosking et al. |
| 8,903,554 B2 | 12/2014 | Stagner |
| 8,918,223 B2 | 12/2014 | Kulyk et al. |
| 9,058,568 B2 | 6/2015 | Hosking et al. |
| 9,058,569 B2 | 6/2015 | Hosking et al. |
| 9,110,647 B2 | 8/2015 | Kulyk et al. |
| 9,235,847 B2 | 1/2016 | Greene et al. |
| 9,424,693 B2 | 8/2016 | Rodrigues |
| 9,429,923 B2 | 8/2016 | Ward et al. |
| 9,514,577 B2 | 12/2016 | Ahn et al. |
| 9,703,339 B2 | 7/2017 | Kulyk et al. |
| 9,740,545 B2 | 8/2017 | Aisu et al. |
| 9,760,068 B2 | 9/2017 | Harkonen et al. |
| 10,101,731 B2 | 10/2018 | Asmus et al. |
| 10,139,877 B2 | 11/2018 | Kulyk et al. |
| 10,190,793 B2 | 1/2019 | Drees et al. |
| 10,250,039 B2 | 4/2019 | Wenzel et al. |
| 10,438,303 B2 | 10/2019 | Chen et al. |
| 2002/0198629 A1 | 12/2002 | Ellis |
| 2004/0054564 A1 | 3/2004 | Fonseca et al. |
| 2007/0005191 A1 | 1/2007 | Sloup et al. |
| 2007/0203860 A1* | 8/2007 | Golden .............. G06Q 10/04 705/412 |
| 2009/0204267 A1 | 8/2009 | Sustaeta et al. |
| 2009/0240381 A1 | 9/2009 | Lane |
| 2009/0313083 A1 | 12/2009 | Dillon et al. |
| 2009/0319090 A1 | 12/2009 | Dillon et al. |
| 2010/0241285 A1 | 9/2010 | Johnson et al. |
| 2011/0018502 A1 | 1/2011 | Bianciotto et al. |
| 2011/0178643 A1 | 7/2011 | Metcalfe |
| 2011/0218691 A1 | 9/2011 | O'Callaghan et al. |
| 2011/0231028 A1 | 9/2011 | Ozog |
| 2011/0231320 A1 | 9/2011 | Irving |
| 2012/0036250 A1 | 2/2012 | Vaswani et al. |
| 2012/0092180 A1 | 4/2012 | Rikkola et al. |
| 2012/0245968 A1 | 9/2012 | Beaulieu et al. |
| 2012/0310860 A1 | 12/2012 | Kim et al. |
| 2013/0010348 A1 | 1/2013 | Massard et al. |
| 2013/0020443 A1 | 1/2013 | Dyckrup et al. |
| 2013/0103481 A1 | 4/2013 | Carpenter et al. |
| 2013/0113413 A1 | 5/2013 | Harty |
| 2013/0204443 A1 | 8/2013 | Steven et al. |
| 2013/0274937 A1 | 10/2013 | Ahn et al. |
| 2014/0039709 A1 | 2/2014 | Steven et al. |
| 2014/0201018 A1 | 7/2014 | Chassin |
| 2014/0244051 A1 | 8/2014 | Rollins et al. |
| 2014/0249680 A1 | 9/2014 | Wenzel |
| 2014/0277769 A1 | 9/2014 | Matsuoka et al. |
| 2014/0316973 A1 | 10/2014 | Steven et al. |
| 2015/0008884 A1 | 1/2015 | Waki et al. |
| 2015/0088576 A1 | 3/2015 | Steven et al. |
| 2015/0134123 A1 | 5/2015 | Obinelo |
| 2015/0309495 A1 | 10/2015 | Delorme et al. |
| 2015/0311713 A1 | 10/2015 | Asghari et al. |
| 2015/0316902 A1 | 11/2015 | Wenzel et al. |
| 2015/0316907 A1 | 11/2015 | Elbsat et al. |
| 2015/0371328 A1 | 12/2015 | Gabel et al. |
| 2016/0020608 A1 | 1/2016 | Carrasco et al. |
| 2016/0043550 A1 | 2/2016 | Sharma et al. |
| 2016/0092986 A1 | 3/2016 | Lian et al. |
| 2016/0148137 A1 | 5/2016 | Phan et al. |
| 2016/0148171 A1 | 5/2016 | Phan et al. |
| 2016/0209852 A1 | 7/2016 | Beyhaghi et al. |
| 2016/0216722 A1 | 7/2016 | Tokunaga et al. |
| 2016/0275630 A1 | 9/2016 | Strelec et al. |
| 2016/0305678 A1 | 10/2016 | Pavlovski et al. |
| 2016/0329708 A1 | 11/2016 | Day |
| 2016/0373453 A1 | 12/2016 | Ruffner et al. |
| 2016/0377306 A1 | 12/2016 | Drees et al. |
| 2016/0379149 A1 | 12/2016 | Saito et al. |
| 2017/0003667 A1 | 1/2017 | Nakabayashi et al. |
| 2017/0083822 A1 | 3/2017 | Adendorff et al. |
| 2017/0097647 A1 | 4/2017 | Lunani et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0167742 A1 | 6/2017 | Radovanovic et al. |
| 2017/0205818 A1 | 7/2017 | Adendorff et al. |
| 2017/0236222 A1 | 8/2017 | Chen et al. |
| 2017/0288455 A1 | 10/2017 | Fife |
| 2017/0351234 A1 | 12/2017 | Chen et al. |
| 2017/0366414 A1 | 12/2017 | Hamilton et al. |
| 2018/0082373 A1 | 3/2018 | Hong et al. |
| 2018/0196456 A1 | 7/2018 | Elbsat |
| 2018/0197253 A1 | 7/2018 | Elbsat et al. |
| 2018/0203961 A1 | 7/2018 | Aisu et al. |
| 2018/0224814 A1 | 8/2018 | Elbsat et al. |
| 2018/0341255 A1 | 11/2018 | Turney et al. |
| 2018/0373234 A1 | 12/2018 | Khalate et al. |
| 2019/0066236 A1 | 2/2019 | Wenzel |
| 2019/0129403 A1 | 5/2019 | Turney et al. |
| 2019/0271978 A1 | 9/2019 | Elbsat et al. |
| 2019/0325368 A1 | 10/2019 | Turney et al. |
| 2019/0338972 A1 | 11/2019 | Schuster et al. |

FOREIGN PATENT DOCUMENTS

| | | |
|---|---|---|
| JP | 2003-141178 | 5/2003 |
| WO | WO-2011/080547 A1 | 7/2011 |
| WO | WO-2012/145563 A1 | 10/2012 |
| WO | WO-2014/143908 A1 | 9/2014 |
| WO | WO-2015/031581 A1 | 3/2015 |
| WO | WO-2016/144586 | 9/2016 |

OTHER PUBLICATIONS

Diederik Kingma and Jimmy Ba. Adam: A Method for Stochastic Optimization. In International Conference on Learning Representations (ICLR), 2015, 15 pages.

Ebbers et al. "Smarter Data Centers—Achieving Great Efficiency—Second Edition", Oct. 21, 2011, 138 pages.

(56) References Cited

OTHER PUBLICATIONS

Extended European Search Report on European Patent Application No. 18150740.1 dated May 16, 2018. 7 pages.
Extended European Search Report on European Patent Application No. 18190786.6 dated Oct. 10, 2018. 7 pages.
George EP Box, Gwilym M Jenkins, Gregory C Reinsel, and Greta M Ljung. Time Series Analysis: Forecasting and Control. John Wiley & Sons, 2015, chapters 4-7 and 13-15. 183 pages.
Jie Chen and Guoxiang Gu. Control-oriented System Identification: an H1 Approach, vol. 19. Wiley-Interscience, 2000, chapters 3 & 8, 38 pages.
Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.
K. J. Astrom. Optimal Control of Markov Decision Processes with Incomplete State Estimation. J. Math. Anal. Appl., 10:174-205, 1965.31 pages.
Kelman and F. Borrelli. Bilinear Model Predictive Control of a HVAC System Using Sequential Quadratic Programming. In Proceedings of the 2011 IFAC World Congress, 2011, 6 pages.
Lennart Ljung and Torsten Soderstrom. Theory and practice of recursive identification, vol. 5. JSTOR, 1983, chapters 2, 3 & 7, 80 pages.
Lennart Ljung, editor. System Identification: Theory for the User (2nd Edition). Prentice Hall, Upper Saddle River, New Jersey, 1999, chapters 5 and 7, 40 pages.
Moritz Hardt, Tengyu Ma, and Benjamin Recht. Gradient Descent Learns Linear Dynamical Systems. arXiv preprint arXiv:1609.05191, 2016, 44 pages.
Moseley et al. "Electrochemical Energy Storage for Renewable Sources and Grid Balancing" Nov. 7, 2014. 14 pages.
Nevena et al. Data center cooling using model-predictive control, 10 pages.
Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.
Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.
Office Action on EP 18190786.6, dated Sep. 23, 2020, 4 pages.
U.S. Appl. No. 16/294,433, filed Mar. 6, 2019, Hitachi-Johnson Controls Air Conditioning, Inc.
Afram et al., "Artificial Neural Network (ANN) Based Model Predictive Control (MPC) and Optimization of HVAC Systems: A State of the Art Review and Case Study of a Residential HVAC System," Energy and Buildings, Apr. 15, 2017, 141, pp. 96-113.
De Carlo et al., "Maintenance Cost Optimization in Condition Based Maintenance: A Case Study for Critical Facilities," International Journal of Engineering and Technology, Oct.-Nov. 2013, 5.5, pp. 4296-4302.
Extended European Search Report on European Patent Application No. 18155069.0 dated Jun. 11, 2018, 6 pages.
Extended European Search Reported on EP Patent Application No. 18176474 dated Sep. 5, 2018, 8 pages.
International Search Report and Written Opinion on PCT/US2018/018039, dated Apr. 24, 2018, 14 pages.
Mohsenian-Rad et al., "Smart Grid for Smart city Activities in the California City of Riverside," In: Alberto Leon-Garcia et al.: "Smart City 360°", Aug. 6, 2016, 22 Pages.
Office Action on EP 18150740.1, dated Nov. 5, 2019, 6 pages.
Office Action on EP 18176474.7 dated Sep. 11, 2019. 5 pages.
Office Action on EP 18176474.7, dated Feb. 10, 2020, 6 pages.
Office Action on EP 18190786.6, dated Feb. 5, 2020, 4 pages.
PJM Economic Demand Resource in Energy Market, PJM State and Member Training Department, 2014, 119 pages.
PJM Manual 11: Energy & Ancillary Services Market Operations, pp. 122-137, PJM, 2015.
PJM Open Access Transmission Tariff, Section 3.3A, Apr. 4, 2016, 10 pages.

* cited by examiner

BUILDING ENERGY STORAGE SYSTEM WITH MULTIPLE DEMAND CHARGE COST OPTIMIZATION

CROSS-REFERENCE TO RELATED APPLICATIONS

This application is a continuation-in-part of U.S. patent application Ser. No. 15/405,236 filed Jan. 12, 2017. This application is also a continuation-in-part of U.S. patent application Ser. No. 16/115,290 filed Aug. 28, 2018, which claims the benefit of and priority to U.S. Provisional Patent Application No. 62/558,135 filed Sep. 13, 2017. The entire disclosure of each of these patent applications is incorporated by reference herein.

BACKGROUND

The present disclosure relates generally to an energy storage system configured to store and discharge energy to satisfy the energy load of a building or campus. The present disclosure relates more particularly to an energy system which optimally allocates energy storage assets (e.g., batteries, thermal energy storage) while accounting for multiple demand charges.

Demand charges are costs imposed by utilities based on the peak consumption of a resource purchased from the utilities during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period. It can be difficult and challenging to optimally allocate energy storage assets in the presence of multiple demand charges.

SUMMARY

One implementation of the present disclosure is a building energy system. The building energy system is configured to serve energy loads of a building or campus. The system includes equipment configured to consume, produce, store, or discharge one or more energy resources. At least one of the energy resources is purchased from a utility supplier. A controller is configured to obtain representative loads and rates for the building or campus for each of a plurality of scenarios and generate a cost function comprising a risk attribute and multiple demand charges. Each of the demand charges corresponds to a demand charge period and defines a cost based on a maximum amount of at least one of the energy resources purchased from the utility supplier during any time step within the corresponding demand charge period. The controller is also configured to determine, for each of the multiple demand charges, a peak demand target for the corresponding demand charge period by performing a first optimization of the risk attribute over the plurality of the scenarios, allocate, to each of a plurality of time steps within an optimization period, an amount of the one or more energy resources to be consumed, produced, stored, or discharged by the building equipment by performing a second optimization of the cost function over the optimization period subject to one or more constraints based on the peak demand target for each of the multiple demand charges, and operate the equipment to consume, produce, store, or discharge the one or more energy resources at each of the plurality of time steps in accordance with a result of the second optimization.

In some embodiments, the controller is configured to modify the cost function by applying a demand charge mask to each of the multiple demand charges. The demand charge masks cause the controller to disregard the resource purchased from the utility during any time steps that occur outside the corresponding demand charge period when calculating a value for the demand charge.

In some embodiments, the risk attribute of the modified cost function includes at least one of a conditional value at risk, a value at risk, or an expected cost.

In some embodiments, performing the second optimization comprises using each peak demand target to implement a peak demand constraint that limits a maximum purchase of the energy resource subject to the demand charge during the corresponding demand period.

In some embodiments, the cost function includes a revenue term that accounts for revenue generated by operating the equipment to participate in an incentive-based demand response program.

In some embodiments, the controller is configured to obtain the representative loads and rates by receiving user input defining the loads and rates for several scenarios and at least one of sampling the representative loads and rates from the user input defining the loads and rates for several scenarios or generating an estimated distribution based on the user input and sampling the representative loads and rates from the estimated distribution.

In some embodiments, the controller is configured to obtain the representative loads and rates by receiving input defining loads and rates for several scenarios where each of the scenarios corresponds to a different time period used by a planning tool, and sampling the representative loads and rates for each scenario from the loads and rates for the corresponding time period used by the planning tool. In some embodiments, each of the historical loads and rates corresponds to different time period and the stochastic optimizer is configured to sample the representative loads and rates for each scenario from the historical loads and rates corresponding to a time period having similar characteristics as the scenario.

In some embodiments, the cost function includes a nonlinear maximum value function for each of the multiple demand charges and the controller is configured to linearize the cost function by replacing each nonlinear maximum value function with an auxiliary demand charge variable.

In some embodiments, the controller is configured to apply a weighting factor to each of the multiple demand charges in the cost function. Each weighting factor scales the corresponding demand charge to the optimization period.

In some embodiments, the controller is configured to calculate each weighting factor by determining a first number of time steps that occur within both the optimization period and the corresponding demand charge period, determining a second number of time steps that occur within the corresponding demand charge period but not within the optimization period, and calculating a ratio of the first number of time steps to the second number of time steps.

Another implementation of the present disclosure is a method for managing a building energy system. The method includes operating equipment to consume, store, or discharge one or more energy resources purchased from a utility supplier and determining an allocation of the energy resources across the equipment over an optimization period by obtaining representative loads and rates for the building or campus for each of a plurality of scenarios, generating a cost function comprising a risk attributed and multiple demand charges (with each of the demand charges corresponding to a demand charge period and defining a cost based on a maximum amount of the at least one energy resource purchased from the utility supplier during any time step within the corresponding demand charge period), determining, for each of the multiple demand charges, a peak demand target for the corresponding demand charge period by performing a first optimization of the risk attribute over the plurality of scenarios, and allocating, to each of a plurality of time steps within an optimization period, an amount of the one or more energy resources to be consumed, produced, stored, or discharged by the building equipment by performing a second optimization of the cost function over the optimization period subject to one or more constraints based on the peak demand target for each of the multiple demand charges. The method also includes controlling the equipment to store or discharge the amount of energy allocated for a current time step of the plurality of time steps.

In some embodiments, the method includes modifying the cost function by applying a demand charge mask to each of the multiple demand charges. The demand charge masks cause the controller to disregard the resource purchased from the utility during any time steps that occur outside the corresponding demand charge period when calculating a value for the demand charges.

In some embodiments, the risk attribute of the modified cost function includes at least one of a conditional value at risk, a value at risk, or an expected cost.

In some embodiments, optimizing the modified cost function includes using each peak demand target to implement a peak demand constraint that limits a maximum purchase of the energy resource subject to the demand charge during the corresponding demand period.

In some embodiments, obtaining the representative loads and rates includes receiving user input defining the loads and rates for several scenarios and at least one of sampling the representative loads and rates from the user input defining the loads and rates for several scenarios or generating an estimated distribution based on the user input and sampling the representative loads and rates from the estimated distribution.

In some embodiments, obtaining the representative loads and rates includes receiving input defining loads and rates for several scenarios. Each of the scenarios corresponds to a different time period used by a planning tool. Obtaining the representative loads and rates may also include sampling the representative loads and rates for each scenario from the loads and rates for the corresponding time period used by the planning tool.

In some embodiments, obtaining the representative loads and rates includes storing a history of past scenarios including actual values for historical loads and rates and at least one of sampling the representative loads and rates from the history of past scenarios or generating an estimated distribution based on the history of past scenarios and sampling the representative loads and rates from the estimated distribution.

In some embodiments, each of the historical loads and rates corresponds to different time periods. The method may include sampling the representative loads and rates for each scenario from the historical loads and rates corresponding to a time period having similar characteristics as the scenario.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
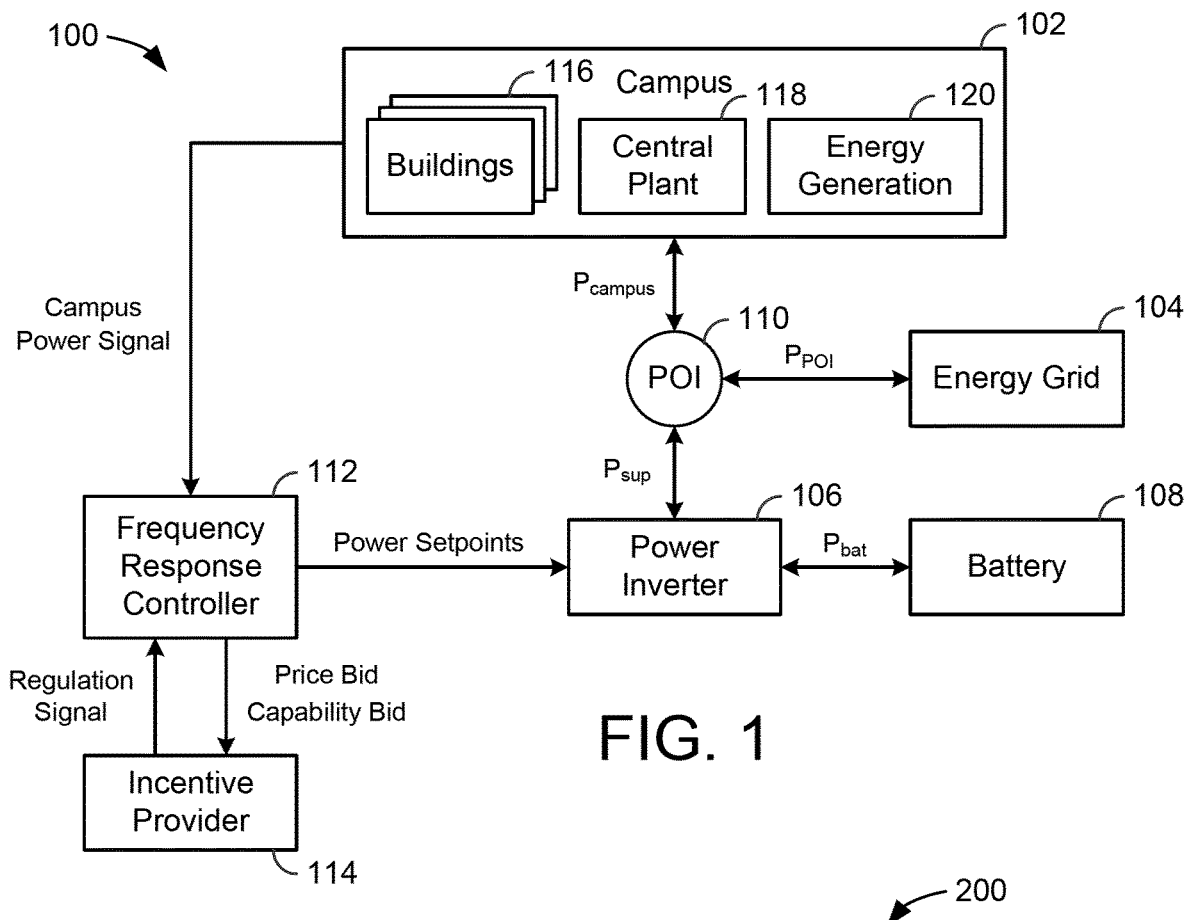
FIG. 1 is a block diagram of a frequency response optimization system, according to an exemplary embodiment.

Referring generally to the FIGURES, an energy storage system with multiple demand charge cost optimization and components thereof are shown, according to various exemplary embodiments. The energy storage system can determine an optimal allocation of energy storage assets (e.g., batteries, thermal energy storage, etc.) over an optimization period. The optimal energy allocation may include an amount of energy purchased from utilities, an amount of energy stored or withdrawn from energy storage, and/or an amount of energy sold to energy purchasers or used to participate in incentive-based demand response (IBDR) programs. In some embodiments, the optimal allocation maximizes the economic value of operating the energy storage system while satisfying the predicted loads for the building or campus and generating revenue from IBDR programs.

Demand charges are costs imposed by utilities based on the peak consumption of a resource purchased from the utilities during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some embodiments, an energy storage controller is used to optimize the utilization of a battery asset. A battery asset can be used to participate in IBDR programs which yield revenue and to reduce the cost of energy and the cost incurred from multiple demand charges. The energy storage controller can perform an optimization process to optimally allocate a battery asset (e.g., by optimally charging and discharging the battery) to maximize its total value. In a planning tool framework, the energy storage controller can perform the optimization iteratively to determine optimal battery asset allocation for an entire simulation period (e.g., an entire year). The optimization process can be expanded to include economic load demand response (ELDR) and can account for multiple demand charges. The energy storage controller can allocate the battery asset at each time step (e.g., each hour) over a given optimization period such that energy and demand costs are minimized and frequency regulation (FR) revenue maximized.

In some instances, one or more of the resources purchased from utilities are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, the energy storage controller may be configured to account for demand charges in the optimization process. In some embodiments, the energy storage controller incorporates demand charges into the optimization problem and the cost function $J(x)$ using demand charge masks and demand charge rate weighting factors. Each demand charge mask may correspond to a particular demand charge and may indicate the time steps during which the corresponding demand charge is active and/or the time steps during which the demand charge is inactive. The demand charge masks may cause the energy storage controller to disregard the electrical energy purchased from the utility during any time steps that occur outside the corresponding demand charge period when calculating a value for the demand charge. Each rate weighting factor may also correspond to a particular demand charge and may scale the corresponding demand charge rate to the time scale of the optimization period.

The following sections of this disclosure describe the multiple demand charge cost optimization technique in greater detail as well as several energy storage systems which can use the cost optimization technique. For example, the multiple demand charge cost optimization technique can be used in a frequency response optimization system with electrical energy storage. The frequency response optimization system is described with reference to FIGS. 1-2. The multiple demand charge cost optimization technique can also be used in a photovoltaic (PV) energy system that simultaneously performs both frequency regulation and ramp rate control using electrical energy storage. The PV energy system is described with reference to FIGS. 3-4.

The multiple demand charge cost optimization technique can also be used in an energy storage system which uses thermal energy storage and/or electrical energy storage to perform load shifting and optimize energy cost. The energy storage system is described with reference to FIGS. 5-6. The multiple demand charge cost optimization technique can also be used in a planning tool which determines the benefits of investing in a battery asset and calculates various financial metrics associated with the investment. The planning tool is described with reference to FIGS. 7-8. The multiple demand charge cost optimization technique is described in greater detail with reference to FIGS. 9-10.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$ and a regulation award $Reg_{award}$, which correspond to the capability price, the performance price, and the capability bid, respectively. In some embodiments, $CP_{cap}$, $CP_{perf}$ and $Reg_{award}$ are the same as the corresponding bids placed by controller 112. In other embodiments, $CP_{cap}$, $CP_{perf}$ and $Reg_{award}$ may not be the same as the bids placed by controller 112. For example, $CP_{cap}$, $CP_{perf}$ and $Reg_{award}$ may be generated by incentive provider 114 based on bids received from multiple participants in the frequency response program. Controller 112 may use $CP_{cap}$, $CP_{perf}$ and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
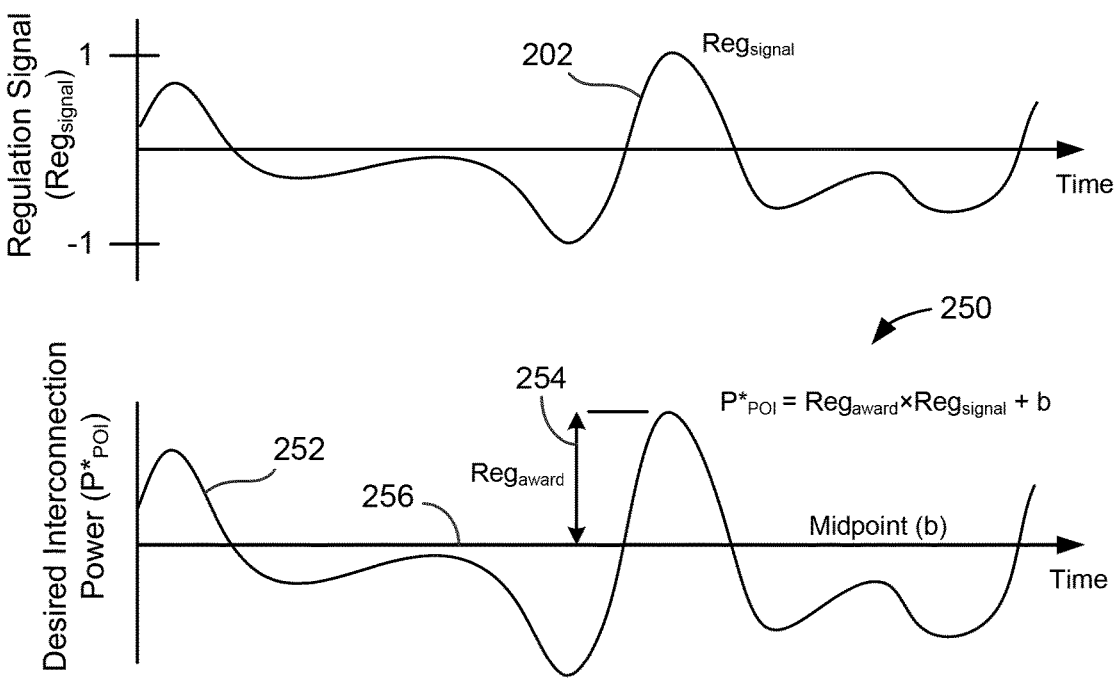
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., −1 ≤ $Reg_{signal}$ ≤ 1). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}$=0.5) may indicate that system 100 is requested to add 5 MW of power at POI 110 relative to midpoint b (e.g., $P_{POI}$*=10 MW×0.5+b), whereas a regulation signal value of −0.3 may indicate that system 100 is requested to remove 3 MW of power from POI 110 relative to midpoint b (e.g., $P_{POI}$*=10 MW×−0.3+b).

Graph 250 illustrates the desired interconnection power $P_{POI}$* 252 as a function of time. $P_{POI}$* 252 may be calculated by frequency response controller 112 based on $Reg_{signal}$ 202, $Reg_{award}$ 254, and a midpoint b 256. For example, controller 112 may calculate $P_{POI}$* 252 using the following equation:

$$P_{POI}^* = Reg_{award} \times Reg_{signal} + b$$

where $P_{POI}$* represents the desired power at POI 110 (e.g., $P_{POI}$*=$P_{sup}$+$P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = \text{Reg}_{award} \times \text{Reg}_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P_{POI}^* = \text{Reg}_{award} \times \text{Res}_{FR} + b$$

where $\text{Res}_{FR}$ is an optimal frequency response generated by optimizing a value function. Controller 112 may subtract $P_{campus}$ from $P_{POI}^*$ to generate the power setpoint for power inverter 106 (i.e., $P_{sup} = P_{POI}^* - P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
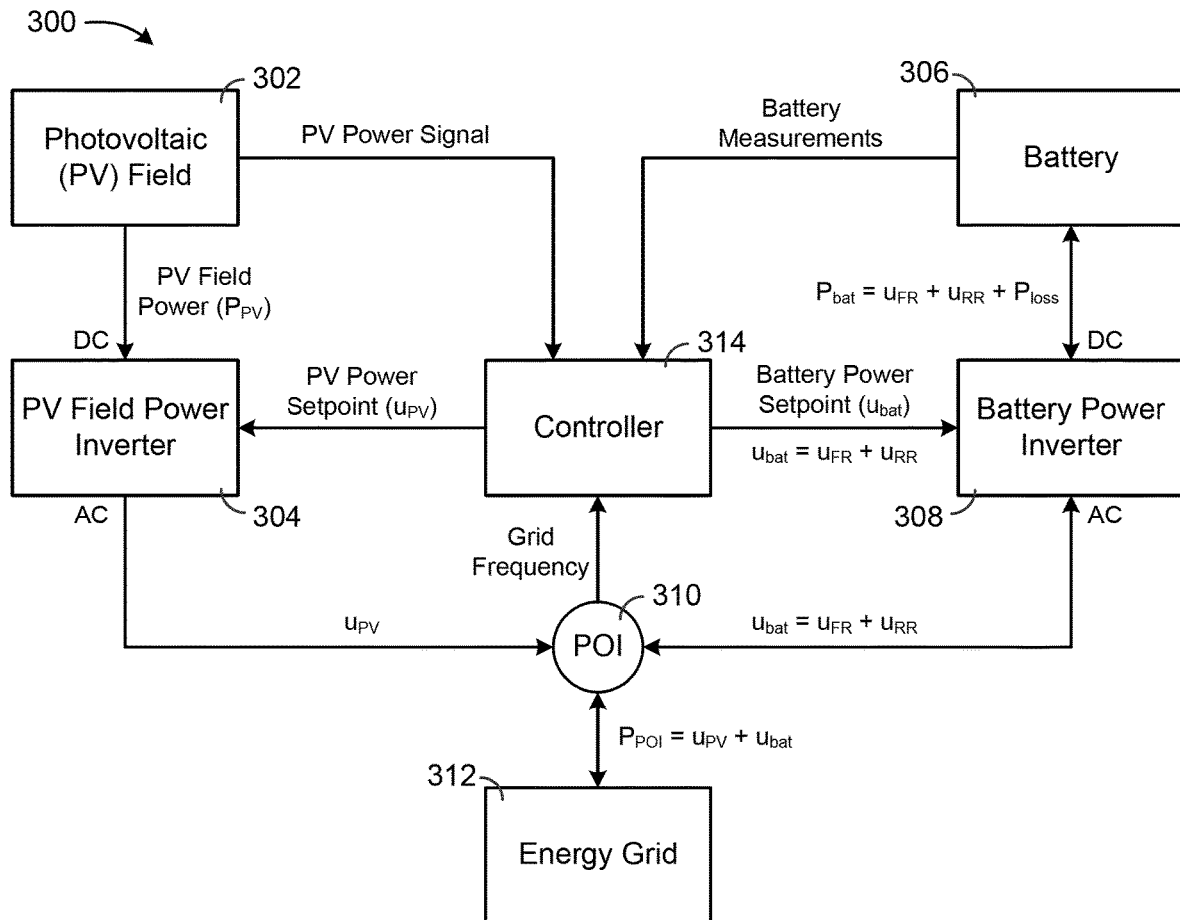
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
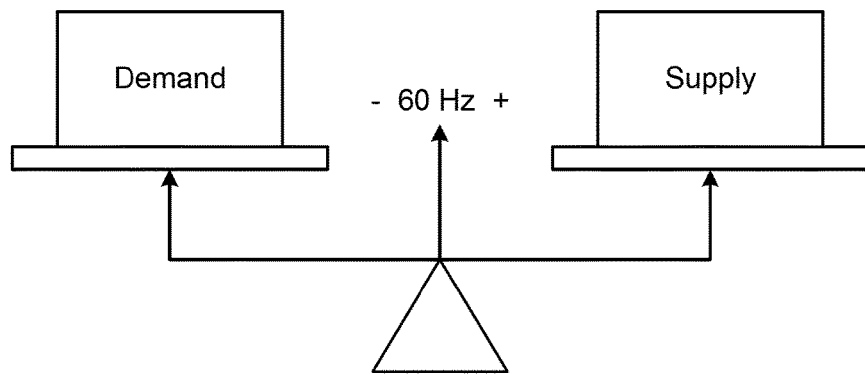
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5:
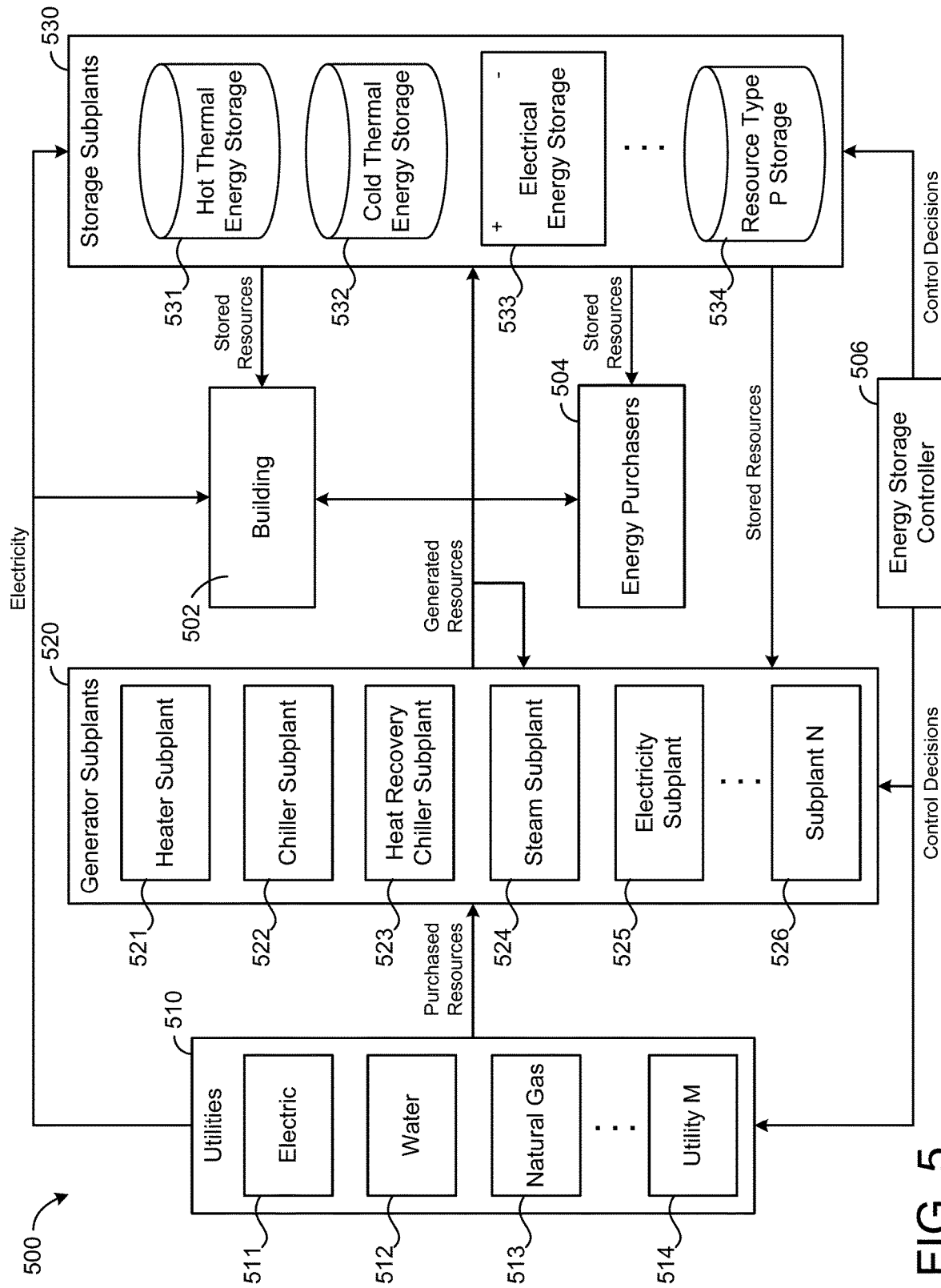
FIG. 5 is a block diagram of an energy storage system including thermal energy storage and electrical energy storage, according to an exemplary embodiment.

Referring now to FIG. 5, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6:
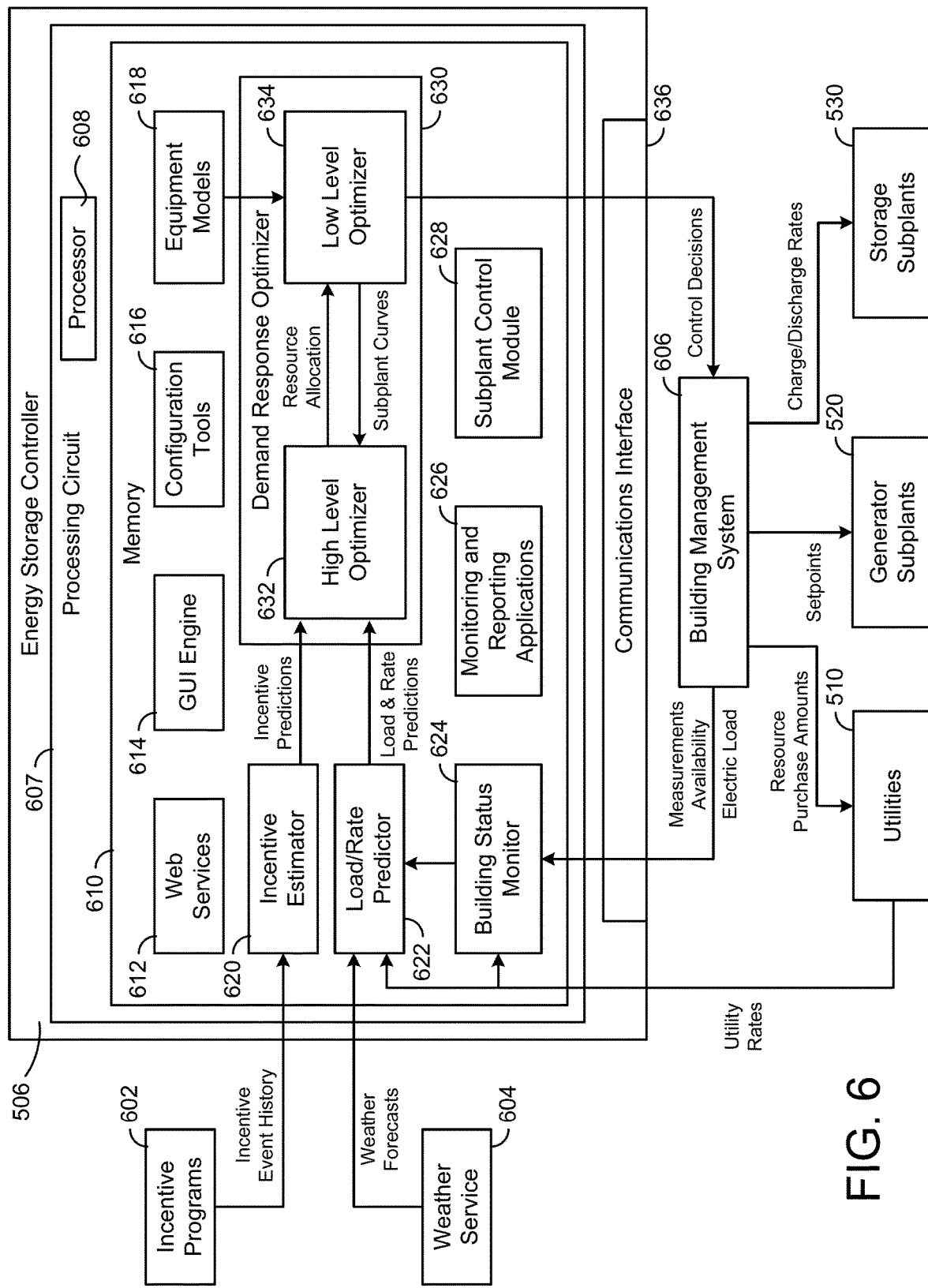
FIG. 6 is block diagram of an energy storage controller which may be used to operate the energy storage system of FIG. 5, according to an exemplary embodiment.

Referring now to FIG. 6, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6, memory 610 is shown to include a load/rate predictor 622. Load/rate predictor 622 may be configured to predict the thermal energy loads ($\hat{\ell}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict loads $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{\ell}_k$ and the utility rates in memory 610 and/or provide the predicted loads $\hat{\ell}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{\ell}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
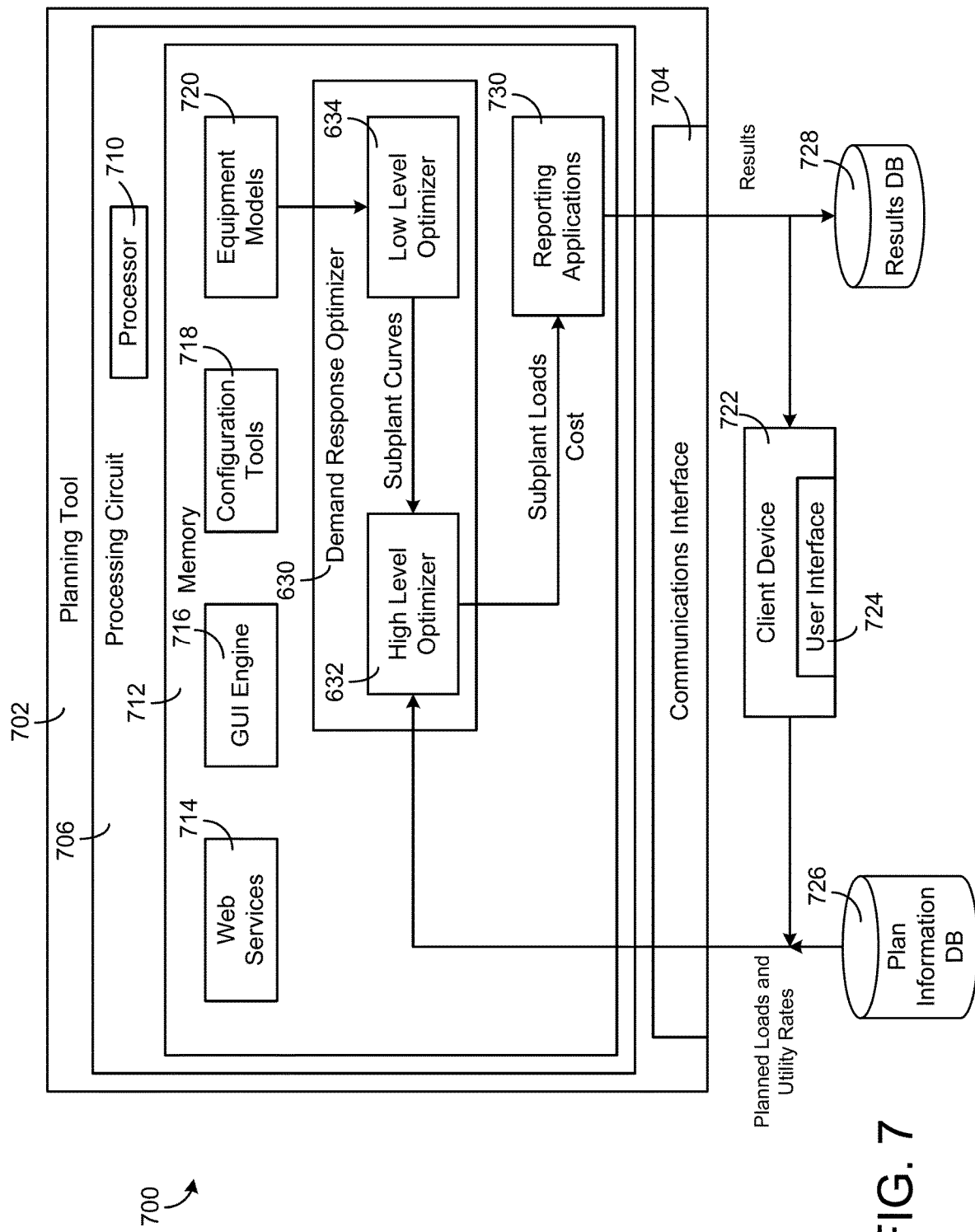
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIG. 6. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
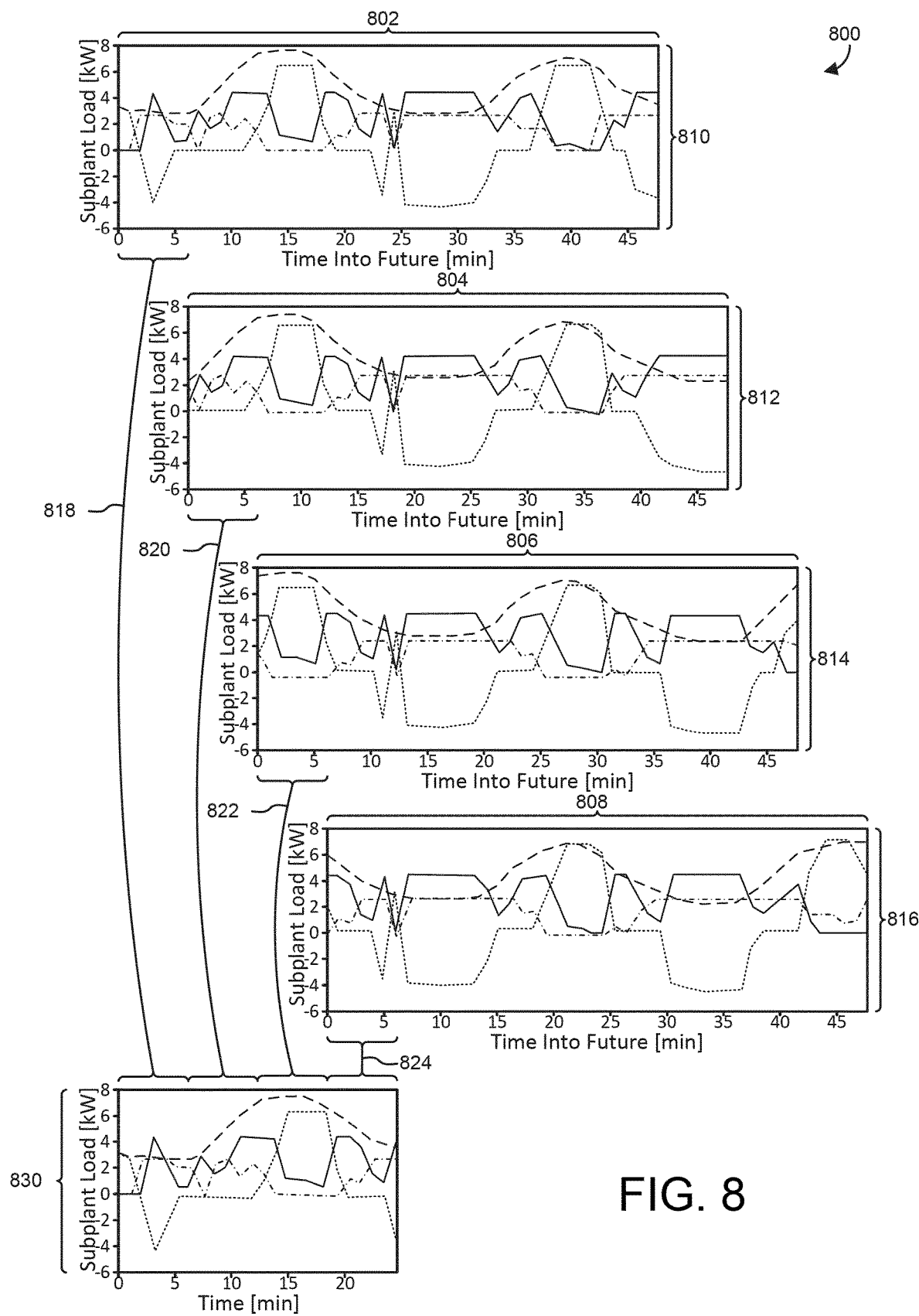
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9A:
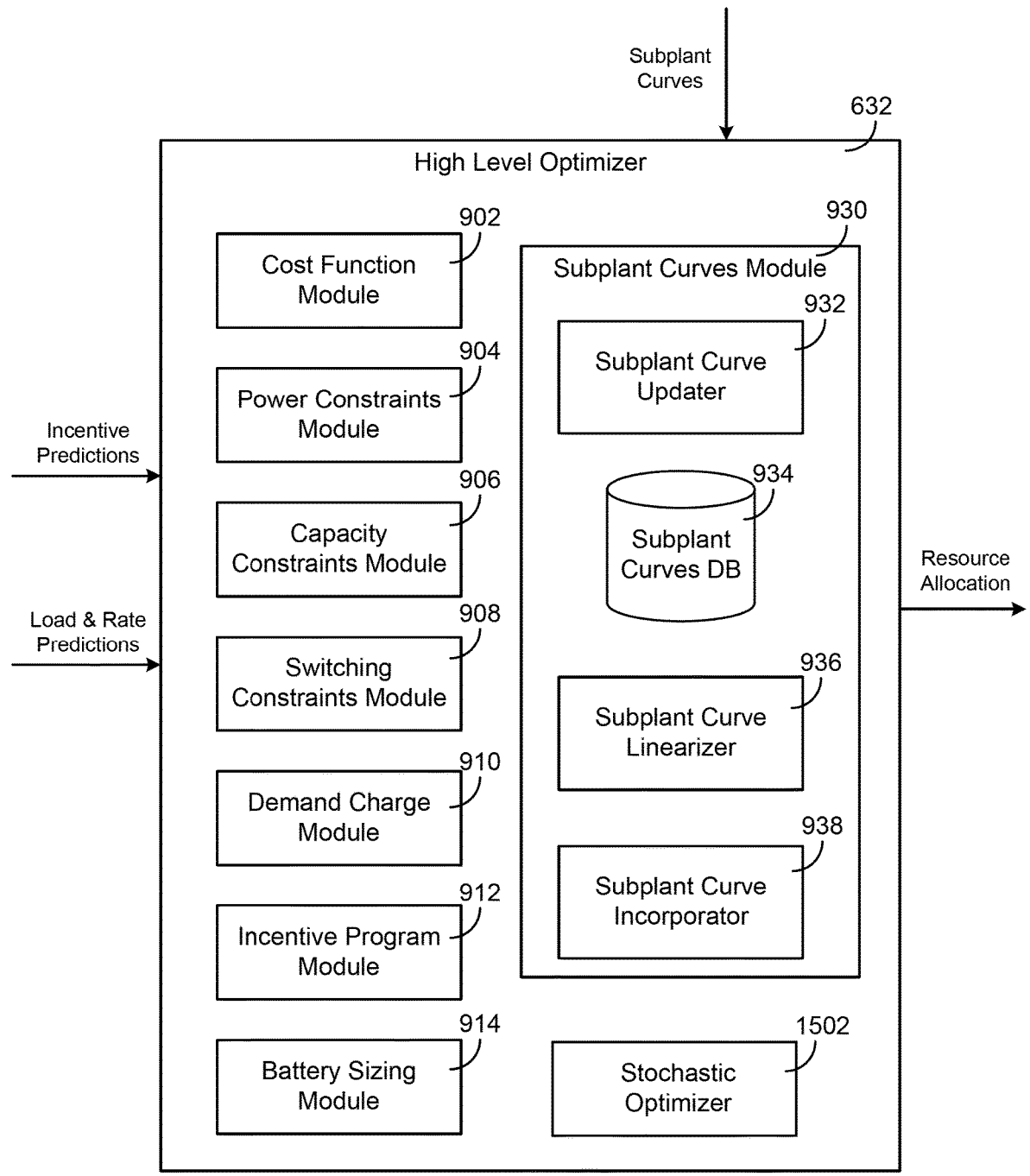
FIG. 9A is a block diagram illustrating a high level optimizer of the energy storage controller of FIG. 5 in greater detail, according to an exemplary embodiment.

Referring now to FIG. 9A, a block diagram illustrating high level optimizer 632 in greater detail is shown, according to an exemplary embodiment. High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from multiple demand charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for multiple demand charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9A, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\arg\min_x J(x)$$

where J(x) is defined as follows:

$$J(x) = \sum_{sources}\sum_{horizon} \text{cost}(\text{purchase}_{resource,time}, \text{time}) - \sum_{incentives}\sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} \text{purchase}_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0 \; \forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources}\left[\sum_{q \in demands_s} w_{demand,s,q} r_{demand,s,q} \max_{i \in demands_{s,q}}(\text{purchase}_{s,i}) + \sum_{horizon} r_{s,i}\text{purchase}_{s,i}\right] - \sum_{incentives}\sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $\text{purchase}_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i}|P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9A, high level optimizer 632 is shown to include a power constraints module 904. Power constraints module 904 may be configured to impose one or more power constraints on the objective function J(x). In some embodiments, power constraints module 904 generates and imposes the following constraints:

$P_{bat_i} + P_{FR_i} \leq P_{eff}$ $-P_{bat_i} + P_{FR_i} \leq P_{eff}$ $P_{bat_i} + P_{FR_i} \leq eLoad_i$ where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$P_{eff} = P_{rated} - P_{PV\,FirmingReserve}$ where $P_{rated}$ is the rated capacity of the battery and $P_{PV\,FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9A, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR}P_{FR_i} \\ \qquad\qquad\qquad\qquad\qquad\qquad \forall\, i = k \ldots k + h - 1 \\ C_a - \sum_{n=k}^{i} P_{bat_n} \geq C_{FR}P_{FR_i} \end{cases}$$

$$\begin{cases} C_a - \sum_{n=k}^{i} P_{bat_n} \leq C_{eff} - C_{FR}P_{FR_{i+1}} \\ \qquad\qquad\qquad\qquad\qquad\qquad \forall\, i = k \ldots k + h - 2 \\ C_a - \sum_{n=k}^{i} P_{bat_n} \geq C_{FR}P_{FR_{i+1}} \end{cases}$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff}-C_{FR}C_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff}-C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff}-C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff}-C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff}=(1-C_{FR}-2C_{socCM})C_{rated}-C_{PV\ FirmingReserve}$$

where $C_{socCM}$ is the control margin and $C_{PV\ FirmingReserve}$ is the capacity reserved for photovoltaic firming.

Still referring to FIG. 9A, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i}|P_{bat_i}-P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} - P_{bat_{i-1}}$$

$$s_i > P_{bat_{i-1}} - P_{bat_i}$$

$$\forall i = k \ldots k+h-1$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Figure 9B:
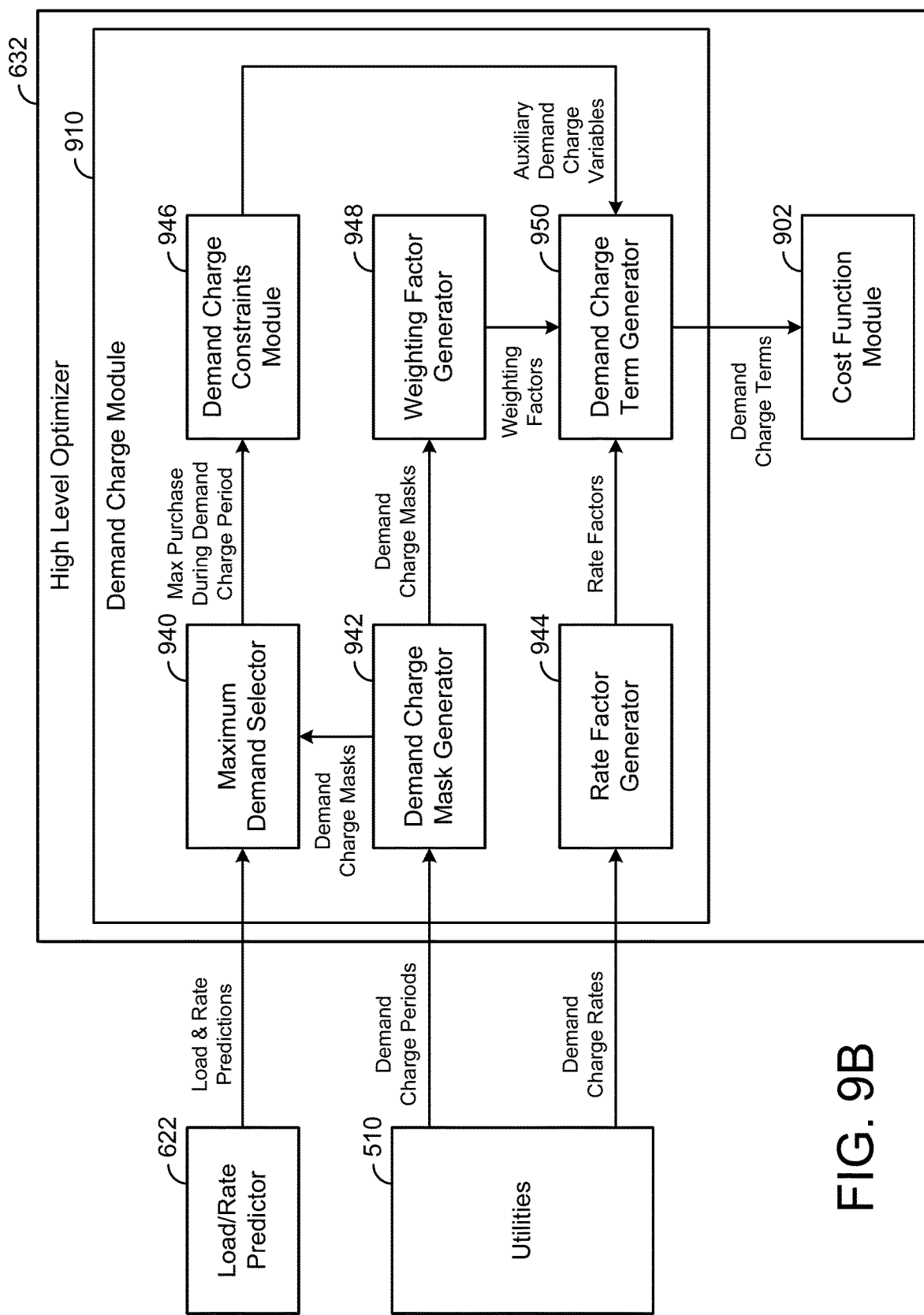
FIG. 9B is a block diagram illustrating the demand charge module of FIG. 9A in greater detail, according to an exemplary embodiment.

Referring now to FIGS. 9A-9B, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to some time steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \cdots \sum_{s \in sources} \sum_{q \in demands_s} w_{demand,s,q} r_{demand,s,q} \max_{i \in demand_{s,q}}(purchase_{s,i}) \cdots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \ldots \sum_{s \in sources} \sum_{q \in demands_s} w_{demand,s,q} r_{demand,s,q} \max_{i \in demands_{s,q}} (g_{s,q,i} \text{purchase}_{s,i}) \ldots$$

where $g_{s,q,i}$ is an element of the demand charge mask.

Referring particularly to FIG. 9B, demand charge module 910 is shown to include a demand charge mask generator 942. In some embodiments, demand charge mask generator 942 receives information about the demand charge periods from utilities 510. Such information may include an indication of when each demand charge period begins, ends, and/or is active. Demand charge mask generator 942 can be configured to generate a demand charge mask for each demand charge q based on the demand charge period information received from utilities 510. Each demand charge mask may indicate the time steps during which the corresponding demand charge is active.

Each demand charge mask generated by demand charge mask generator 942 may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ ∀i=1, 2, 3, 8, 9, 10) and active during time steps i=4, 5, 6, 7, 11, 12 (i.e., $g_{s,q,i}=1$ ∀i=4, 5, 6, 7, 11, 12). Accordingly, the term $g_{s,q,i}\text{purchase}_{s,i}$ within the max( ) function may have a value of zero for all time steps during which the demand charge q is inactive.

In some embodiments, demand charge module 910 includes a maximum demand selector 940. Maximum demand selector 940 can be configured to determine the maximum purchase from each source s during each demand charge period. In some embodiments, maximum demand selector 940 receives the demand charge masks from demand charge mask generator 942. Maximum demand selector 940 can use the demand charge masks to determine the time steps during which each demand charge is active. Maximum demand selector 940 can also receive load predictions and/or rate predictions for each time step from load/rate predictor 622. In some embodiments, maximum demand selector 940 uses the load predictions to predict resource purchases during each time step. Maximum demand selector 940 can use the predicted resource purchases in combination with the demand charge masks to selectively mask resource purchases that occur outside the corresponding demand charge period.

In some embodiments, maximum demand selector 940 multiplies each resource purchase by an element of the corresponding demand charge mask (e.g., a value of one or zero) to selectively mask only the resource purchases that occur outside the applicable demand charge period. Of the remaining, non-masked, resource purchases (e.g., those multiplied by a value of one when the demand charge mask is applied), maximum demand selector 940 can select the maximum. This causes maximum demand selector 940 to select the maximum purchase from source s that occurs during only the time steps for which the demand charge q is active. In some embodiment, maximum demand selector 940 provides the maximum resource purchases during each demand charge period to demand charge term generator 950 for use in generating a demand charge term in the cost function J(x). In other embodiments, maximum demand charge selector 940 provides the maximum resource purchases during each demand charge period to demand charge constraints module 946 for use in generating and constraining auxiliary demand charge variables. Both of these options are described in detail below.

Still referring to FIG. 9B, demand charge module 910 is shown to include a weighting factor generator 948. In some embodiments, weighting factor generator 948 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, weighting factor generator 948 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The weighting factors can be provided to demand charge term generator 950 for use in generating demand charge terms in the cost function J(x).

In some embodiments, demand charge module 910 includes a rate factor generator 944. Rate factor generator 944 can be configured to generate a rate factor $r_{d_q}$ for each demand charge q in the cost function J(x). Each rate factor $r_{d_q}$ may indicate the demand charge rate associated with the corresponding demand charge q. For example, the rate factor $r_{d_q}$ may define a cost per unit of electricity purchased from utilities 510 (e.g., $/kW), a cost per unit of water purchased from utilities 510 (e.g., $/gallon), etc. Each rate factor $r_{d_q}$ may be multiplied by the maximum resource purchase during the applicable demand charge period to determine the total cost of the corresponding demand charge q. The rate factors can be provided to demand charge term generator 950 for use in generating demand charge terms in the cost function J(x).

Still referring to FIG. 9B, demand charge module 910 is shown to include a demand charge term generator 950. Demand charge term generator 950 can be configured to generate one or more demand charge terms to be added to the cost function J(x). The following example illustrates how demand charge term generator 950 can incorporate multiple demand charges into the cost function J(x). In this example, a single source of electricity (e.g., an electric grid) is considered with multiple demand charges applicable to the electricity source (i.e., q=1 . . . N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge term generator 950 can modify the cost function J(x) to account for the N demand charges as shown in the following equation:

$$J(x) = \cdots + w_{d_1} r_{d_1} \max_i(g_{1_i}(-P_{bat_i} + eLoad_i)) +$$
$$\cdots + w_{d_q} r_{d_q} \max_i(g_{q_i}(-P_{bat_i} + eLoad_i)) +$$
$$\cdots + w_{d_N} r_{d_N} \max_i(g_{N_i}(-P_{bat_i} + eLoad_i))$$

where the term $-P_{bat_i}+eLoad_i$ represents the total amount of electricity purchased from the electric grid during time step i (i.e., the total electric load $eLoad_i$ minus the power discharged from the battery $P_{bat_i}$). Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., $/kW) and the weighting factor $w_{d_q}$ indicates the weight applied to the qth demand charge.

Demand charge term generator 950 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge term generator 950 linearizes the demand charge terms of the cost function J(x) by introducing an auxiliary variable $d_q$ for each demand charge q. In the case of the previous example, this will result in N auxiliary variables $d_1$ . . . $d_N$ being introduced as decision variables in the cost function J(x). Demand charge term generator 950 can modify the cost function J(x) to include the linearized demand charge terms as shown in the following equation:

$$J(x) = \ldots + w_{d_1}r_{d_1}d_1 + \ldots + w_{d_q}r_{d_q}d_q + \ldots + w_{d_N}r_{d_N}d_N$$

In some embodiments, demand charge module 910 includes a demand charge constraints generator 946. Demand charge constraints generator 946 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall i = k \ldots k+h-1, \quad g_{1_i} \neq 0$$
$$d_1 \geq 0 \qquad \vdots$$
$$d_q \geq g_{q_i}(-P_{bat_i} + eLoad_i) \quad \forall i = k \ldots k+h-1, \quad g_{q_i} \neq 0$$
$$d_q \geq 0 \qquad \vdots$$
$$d_N \geq g_{N_i}(-P_{bat_i} - eLoad_i) \quad \forall i = k \ldots k+h-1, \quad g_{N_i} \neq 0$$
$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration. Demand charge constraints generator 946 can provide the auxiliary demand charge variables to demand charge term generator 950. The demand charge constraints can be used to constrain the auxiliary demand charge variables in the optimization performed by high level optimizer 632.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 . . . 3), where $g_q$ includes an element for each time step of the optimization period (i.e., $g_q=[g_{q_1} \ldots g_{q_{24}}]$). The three demand charge masks can be defined as follows:

$$g_{1_i}=1 \ \forall i=1 \ldots 24$$

$$g_{2_i}=1 \ \forall i=12 \ldots 18$$

$$g_{3_i}=1 \ \forall i=9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two.

As shown in FIG. 9A, the high level optimizer 632 includes a stochastic optimizer 1502. The stochastic optimizer 1502 is described in detail with reference to FIG. 15 below. In the example of FIGS. 9A-9B, the stochastic optimizer 1502 may be configured to facilitate the demand charge module 910 in providing stochastic optimization of the multiple demand charge periods. That is, for each of multiple demand charge periods described with reference to FIGS. 9A-13, the stochastic optimizer 1502 may operate as described with reference to FIGS. 14-17.

Incentive Program Incorporation

Referring again to FIG. 9A, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_i$ is a binary decision variable indicating whether to participate in the ELDR program during time step i $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \sum_{l=1}^{4} \frac{e_{li}}{4} + \sum_{p=m-4}^{m-2} \frac{1}{3} \left( eLoad_p - P_{bat_p} - \sum_{l=1}^{4} \frac{e_{lp}}{4} \right) - (eLoad_i - P_{bat_i}) \right) \right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i / r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d - \sum_{i=k}^{k+h-1} b_i r_{Da_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Battery Sizing

Still referring to FIG. 9A, high level optimizer 632 is shown to include a battery sizing module 914. Battery sizing module 914 can be configured to determine the optimal battery size (e.g., the energy capacity and/or the inverter power) required to minimize or maximize a given financial metric. Such metrics include SPP, IRR, and/or NPV. The effective capacity $C_{eff}$ and the effective power $P_{eff}$ parameters of the battery appear linearly in the capacity constraints and the power constraints, previously described. Accordingly, battery sizing module 914 can treat these parameters as variables to be optimized without affecting its linear property.

Although this approach is described primarily with respect to the sizing of a battery system, the approach may be extended to size equipment, such as chillers or heaters. The effective power $P_{eff}$ and capacity $C_{eff}$ can be interpreted as a demand of an asset, where the cost of the asset is desired to be minimized. The battery sizing approach determines the optimal battery size, while minimizing energy and demand costs, while maximizing revenue from incentive programs. The costs associated with a battery system include an energy cost, a power cost, and a fixed cost. The fixed cost can be any cost related to the battery system that is independent of energy capacity and power capacity. This cost is only incurred when the energy capacity is nonzero. Therefore, an integer decision variable (e.g., having a value of one or zero) can be used when considering battery sizing in the optimization problem. In some embodiments, battery sizing module 914 solves the optimization problem with mixed integer linear programming.

The following example illustrates an implementation of the battery sizing technique in which the cost function J(x) includes a single demand charge and FR participation. Battery sizing module 914 can adjust the cost function as shown in the following equation:

$$J(x) = -\sum_{i=k}^{k+h-1} r_{e_i} P_{bat_i} - \sum_{i=k}^{k+h-1} r_{FR_i} P_{FR_i} + \sum_{i=k}^{k+h-1} r_{s_i} s_i + w_d r_d d + w_{EUC} r_{EUC} C_{eff} + w_{PUC} r_{PUC} P_{eff} + w_{bat} r_{bat} v$$

where $r_{EUC}$ and $w_{EUC}$ are the energy unit cost (e.g., $/kWh) and corresponding weight adjustment over the optimization period, $r_{PUC}$ and $w_{PUC}$ are the power unit cost (e.g., $/kW) and corresponding weight adjustment over the optimization period, $r_{bat}$ and $w_{bat}$ are the fixed cost (e.g., $) and its corresponding weight adjustment over the optimization period, and v is a logical decision variable.

Battery sizing module 914 can generate and impose the following constraints on the optimization problem:

$$P_{bat_i} \leq P_{eff}$$

$$-P_{bat_i} \leq P_{eff}$$

$$C_{eff} - Mv \leq 0$$

$$P_{eff} - C_{rate} C_{eff} \leq 0$$

where M is set to a large number (e.g., ten thousand) and $C_{rate}$ is the power to energy ratio. The final constraint can be added to limit the size of the battery based on the application desired. In some embodiments, the effective capacity $C_{eff}$ and effective power $P_{eff}$ can be treated as demand charges.

The values of the capacities can be carried over as the optimization is solved and the horizon is shifted in time.

Subplant Curve Incorporation

Still referring to FIG. 9A, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 838 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 838 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 838 may determine that high level optimizer 632 is overusing electricity. In response to a determination that high level optimizer 632 is overusing electricity, subplant curve incorporator 838 may constrain the production of heat recovery chiller subplant 523 at its current value and constrain the electricity use of subplant 523 to the corresponding value on the subplant curve. High level optimizer 632 may then rerun the optimization with the new equality constraints.

Energy Storage Allocation Process

Figure 10:
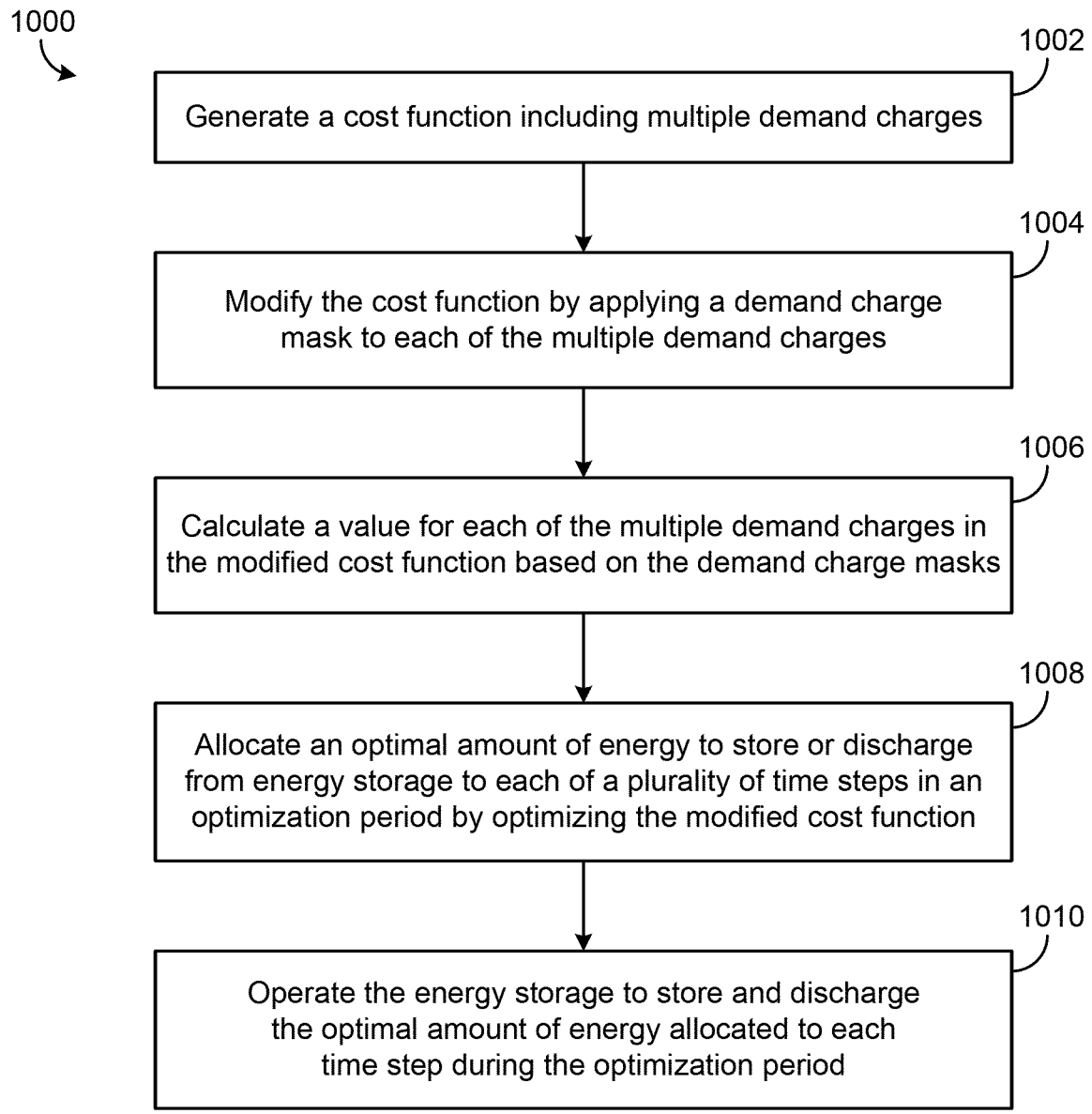
FIG. 10 is a flowchart of a process for allocating energy storage which can be performed by the energy storage controller of FIG. 5, according to an exemplary embodiment.

Referring now to FIG. 10, a flowchart of a process 1000 for allocating energy storage is shown, according to an exemplary embodiment. Process 1000 can be performed by one or more components of frequency response optimization system 100, photovoltaic energy system 300, energy storage system 500, planning system 700, or any other type of energy storage system. In some embodiments, process 1000 is performed by energy storage controller 506, as described with reference to FIGS. 5-9.

Process 1000 is shown to include generating a cost function including multiple demand charges (step 1002). In some embodiments, each of the demand charges corresponds to a demand charge period and defines a cost based on a maximum amount of energy purchased from a utility during any time step within the corresponding demand charge period. In some embodiments, step 1002 is performed by cost function module 902. The cost function generated in step 1002 can be the same or similar to any of the cost functions J(x) described with reference to FIGS. 9A-9B.

Process 1000 is shown to include modifying the cost function by applying a demand charge mask to each of the multiple demand charges (step 1004). In some embodiments, the demand charge masks are created by demand charge module 910, as described with reference to FIGS. 9A-9B. Each demand charge mask may define one or more time steps that occur within the corresponding demand charge period. In some embodiments, each demand charge mask includes a vector of binary values. Each of the binary values may correspond to a time step that occurs within the optimization period and may indicate whether the demand charge is active or inactive during the corresponding time step.

Process 1000 is shown to include calculating a value for each of the multiple demand charges in the modified cost function based on the demand charge masks (step 1006). In some embodiments, step 1006 is performed by high level optimizer 632 as part of an optimization process. The demand charge masks may cause high level optimizer 632 to disregard the energy purchased from the utility during any time steps that occur outside the corresponding demand charge period when calculating the value for the corresponding demand charge.

Process 1000 is shown to include allocating an optimal amount of energy to store or discharge from energy storage to each of a plurality of time steps in an optimization period (step 1008). Step 1008 can include optimizing the modified cost function generated in step 1004 to determine the optimal amounts of energy to store or discharge in each time step. In some embodiments, the energy is electrical energy and the energy storage is a battery asset. In other embodiments, the energy is thermal energy and the energy storage includes thermal energy storage tanks.

Process 1000 is shown to include operating the energy storage to store and discharge the optimal amount of energy allocated to each time step during the optimization period (step 1010). Storing energy and other types of resources allows for the resources to be purchased at times when the resources are relatively less expensive (e.g., during non-peak electricity hours) and stored for use at times when the resources are relatively more expensive (e.g., during peak electricity hours). Storing resources also allows the resource demand of the building to be shifted in time. For example, resources can be purchased from utilities at times when the demand for heating or cooling is low and immediately converted into hot or cold thermal energy (e.g., by generator subplants 520). The thermal energy can be stored and retrieved at times when the demand for heating or cooling is high. This allows energy storage controller 506 to smooth the resource demand of the building and reduces the maximum required capacity of generator subplants 520. Smoothing the demand also allows energy storage controller 506 to reduce the peak amount of energy purchased from the utility during an applicable demand charge period, which results in a lower demand charge.

Energy Cost Optimization System

Figure 11:
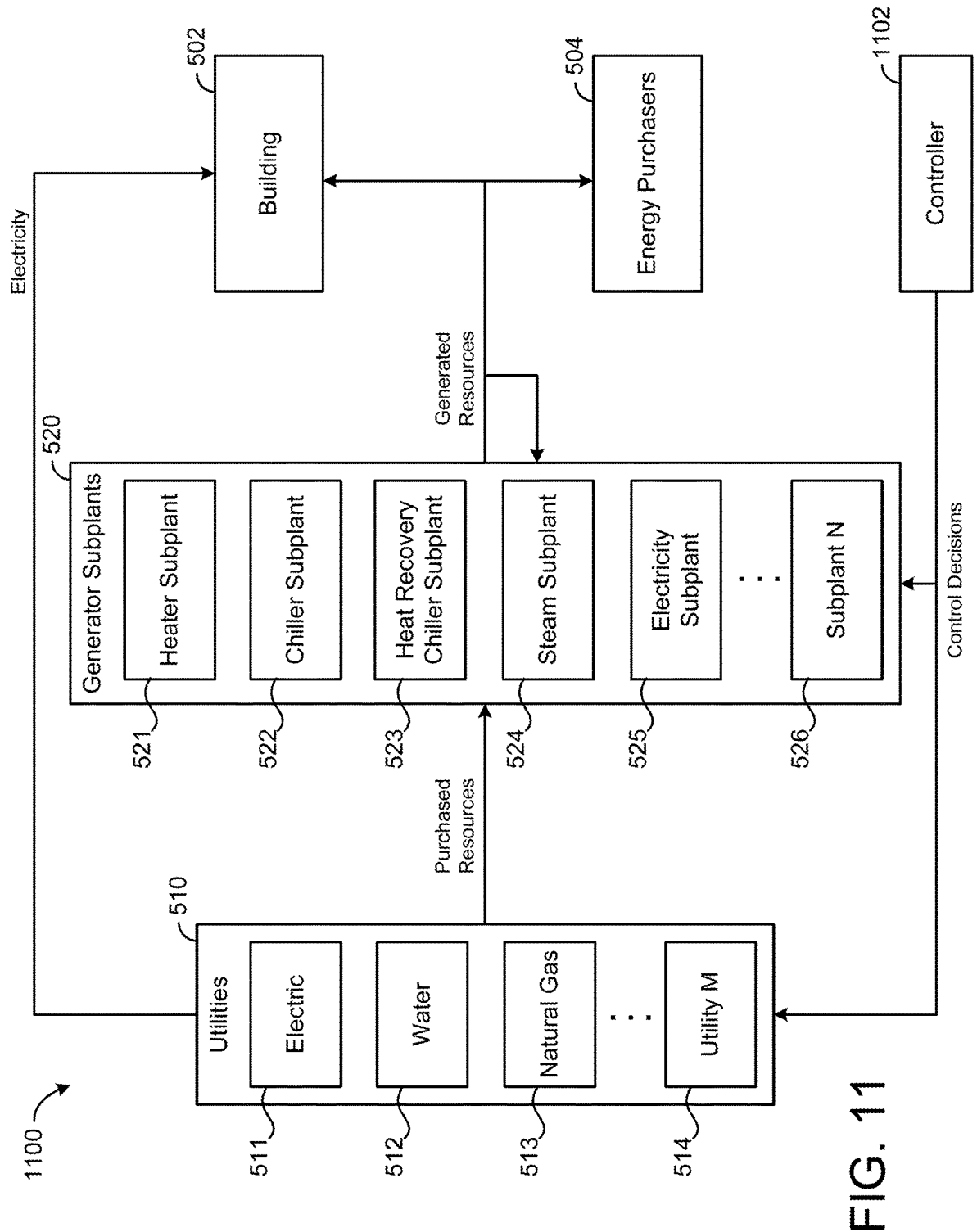
FIG. 11 is a block diagram of an energy cost optimization system without thermal or electrical energy storage, according to an exemplary embodiment.

Referring now to FIG. 11, a block diagram of an energy cost optimization system 1100 is shown, according to an exemplary embodiment. Energy cost optimization system 1100 is shown to include many of the same components as energy storage system 500 (described with reference to FIG. 5) with the exception of storage subplants 530. System 1100 is an example of a system without thermal or electrical energy storage in which the multiple demand charge cost optimization techniques can be implemented.

Energy cost optimization system 1100 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 1100. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 1100 operates to satisfy the resource demand associated with building 502.

Energy cost optimization system 1100 is shown to include a plurality of utilities 510. Utilities 510 may provide system 1100 with resources such as electricity, water, natural gas, or any other resource that can be used by system 1100 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 1100 is shown to include a plurality of generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 11, energy cost optimization system 1100 is shown to include a controller 1102. Controller 1102 may be configured to control the distribution, production, and usage of resources in system 1100. In some embodiments, controller 1102 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 1102 may be configured to maximize the economic value of operating energy cost optimization system 1100 over the duration of the optimization period. The economic value may be defined by a value function that expresses economic value as a function of the control decisions made by controller 1102. The value function may account for the cost of resources purchased from utilities 510, revenue generated by selling resources to energy purchasers 504, and the cost of operating system 1100. In some embodiments, the cost of operating system 1100 includes a cost of excessive equipment start/stops during the optimization period.

Each of subplants 520 may include equipment that can be controlled by controller 1102 to optimize the performance of system 1100. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 1102.

In some embodiments, one or more of subplants 520 includes a subplant level controller configured to control the equipment of the corresponding subplant. For example, controller 1102 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 1100 and controller 1102 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization Controller

Figure 12:
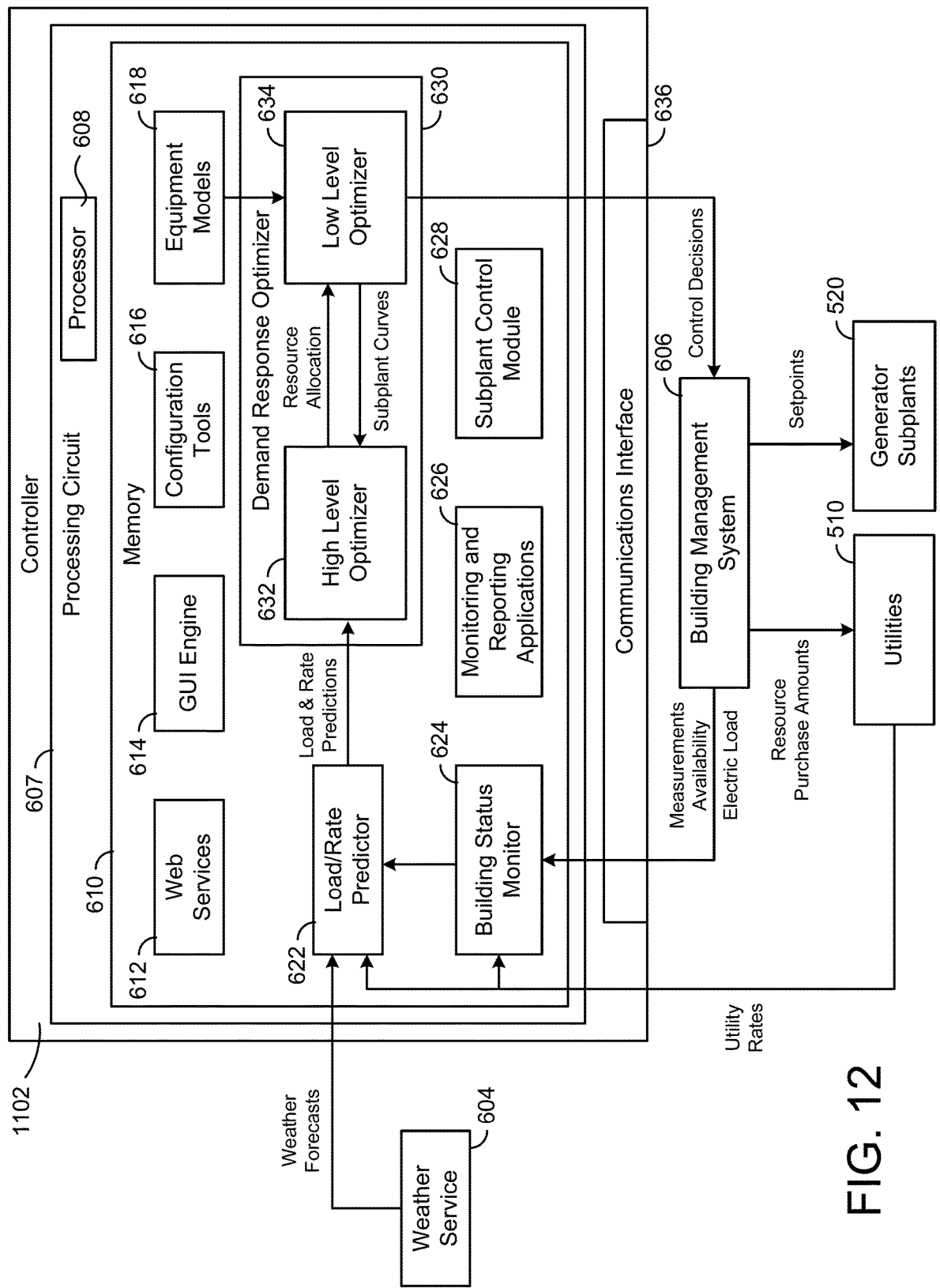
FIG. 12 is a block diagram of a controller which may be used to operate the energy cost optimization system of FIG. 11, according to an exemplary embodiment.

Referring now to FIG. 12, a block diagram illustrating controller 1102 in greater detail is shown, according to an exemplary embodiment. Controller 1102 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 1102. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 1102 specifying on/off states and/or setpoints for the subplant equipment. BMS 606 may control the equipment (e.g., via actuators, power relays, etc.) in accordance with the control signals provided by controller 1102. For example, BMS 606 may operate the equipment using closed loop control to achieve the setpoints specified by energy storage controller 1102. In various embodiments, BMS 606 may be combined with controller 1102 or may be part of a separate building management system. According to an exemplary embodiment, BMS 606 is a METASYS® brand building management system, as sold by Johnson Controls, Inc.

Controller 1102 may monitor the status of the controlled building using information received from BMS 606. Controller 1102 may be configured to predict the thermal energy loads (e.g., heating loads, cooling loads, etc.) of the building for plurality of time steps in an optimization period (e.g., using weather forecasts from a weather service 604). Controller 1102 may generate control decisions that optimize the economic value of operating system 1100 over the duration of the optimization period subject to constraints on the optimization process (e.g., energy balance constraints, load satisfaction constraints, etc.). The optimization process performed by controller 1102 is described in greater detail below.

Controller 1102 is shown to include a communications interface 636 and a processing circuit 607 having a processor 608 and memory 610. These components may be the same as described with reference to FIG. 6. For example, controller 1102 is shown to include demand response optimizer 630. Demand response optimizer 630 may perform a cascaded optimization process to optimize the performance of system 1100. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 1102 may be the same as previously described with reference to FIG. 6.

Energy Cost Optimization Process

Figure 13:
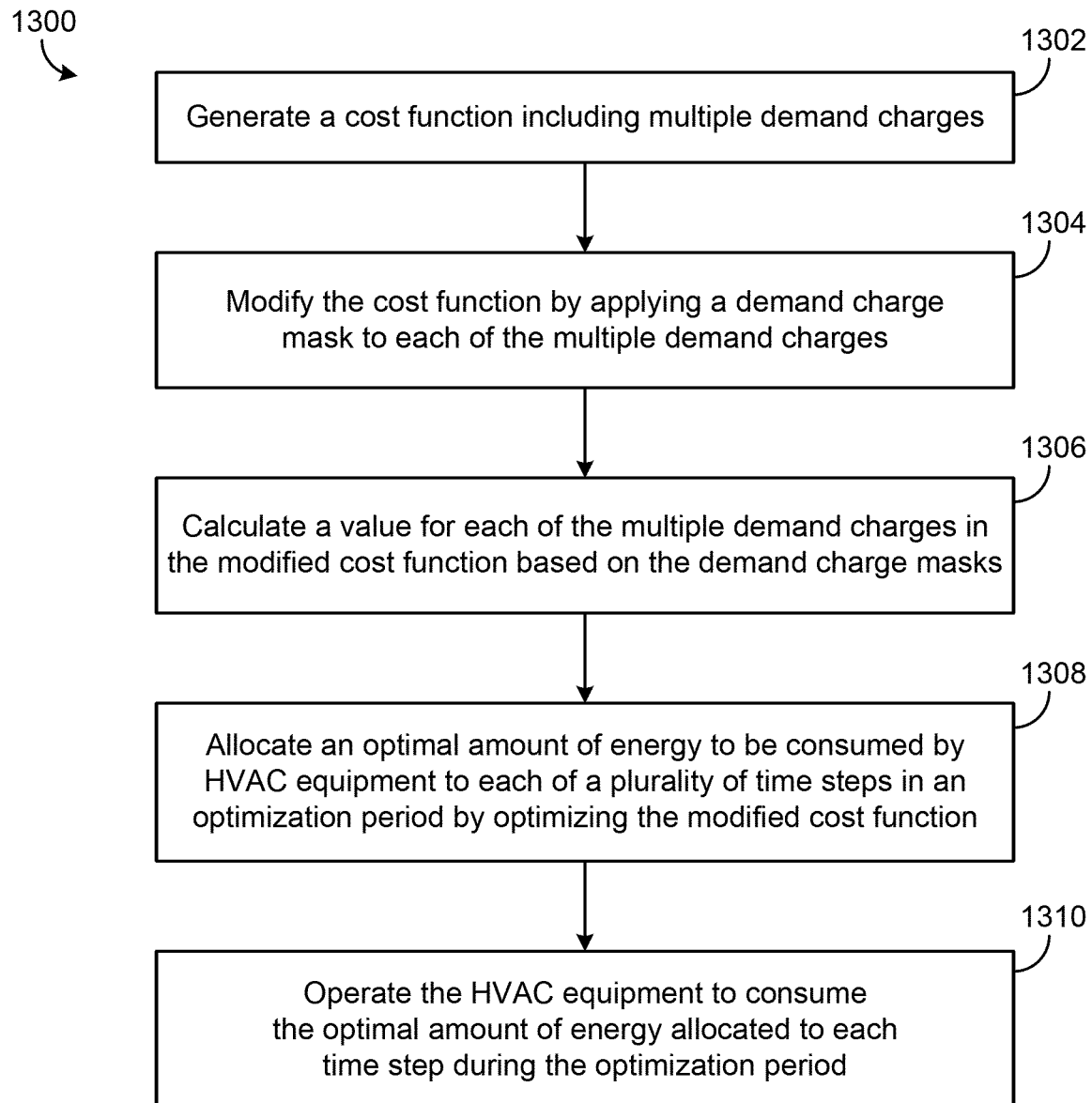
FIG. 13 is a flowchart of a process for optimizing energy cost which can be performed by the controller of FIG. 12, according to an exemplary embodiment.

Referring now to FIG. 13, a flowchart of a process 1300 for optimizing energy cost with multiple demand charges is shown, according to an exemplary embodiment. Process 1300 can be performed by one or more components of frequency response optimization system 100, photovoltaic energy system 300, planning system 700, energy cost optimization system 1100, or any other type of energy system. In some embodiments, process 1300 is performed by controller 1102, as described with reference to FIGS. 10-12.

Process 1300 is shown to include generating a cost function including multiple demand charges (step 1302). In some embodiments, each of the demand charges corresponds to a demand charge period and defines a cost based on a maximum amount of energy purchased from a utility during any time step within the corresponding demand charge period. In some embodiments, step 1302 is performed by cost function module 902. The cost function generated in step 1302 can be the same or similar to any of the cost functions J(x) described with reference to FIGS. 9A-9B.

Process 1300 is shown to include modifying the cost function by applying a demand charge mask to each of the multiple demand charges (step 1304). In some embodiments, the demand charge masks are created by demand charge module 910, as described with reference to FIGS. 9A-9B. Each demand charge mask may define one or more time steps that occur within the corresponding demand charge period. In some embodiments, each demand charge mask includes a vector of binary values. Each of the binary values may correspond to a time step that occurs within the optimization period and may indicate whether the demand charge is active or inactive during the corresponding time step.

Process 1300 is shown to include calculating a value for each of the multiple demand charges in the modified cost function based on the demand charge masks (step 1306). In some embodiments, step 1306 is performed by high level optimizer 632 as part of an optimization process. The demand charge masks may cause high level optimizer 632 to disregard the energy purchased from the utility during any time steps that occur outside the corresponding demand charge period when calculating the value for the corresponding demand charge.

Process 1300 is shown to include allocating an optimal amount of energy to be consumed by HVAC equipment to each of a plurality of time steps in an optimization period (step 1308). Step 1308 can include optimizing the modified cost function generated in step 1304 to determine the optimal amounts of energy to consume and/or purchase from the utility in each time step. In some embodiments, the amount of energy consumed by the HVAC equipment may be equal to the amount of energy purchased from the utility. In other embodiments, the amount of energy consumed by the HVAC equipment in a given time step may be less than the amount of energy purchased from the utility. For example, some electricity purchased from the utility may be provided directly to the building to satisfy the building's electric load, whereas the remaining electricity purchased from the utility may be consumed by the HVAC equipment. In some embodiments, step 1308 includes determining an optimal amount of energy to purchase from the utility as well as the optimal amount of energy to be consumed by the HVAC equipment during each time step in the optimization period.

Process 1300 is shown to include operating the HVAC equipment to consume the optimal amount of energy allocated to each time step during the optimization period (step 1310). Step 1310 can include operating any of generator subplants 520 to consume purchased resources and/or generate resources that can be provided to building 502. In some embodiments, step 1310 includes providing a portion of the energy purchased from the utility to the building 502. For example, the amount of energy purchased in each time step can be used by generator subplants 520 to generate various resources (e.g., hot thermal energy, cold thermal energy, etc.) or provided directly to building 502 (e.g., providing purchased electricity to building 502).

Stochastic Optimization

The various systems and methods described above may be implemented with, executed with, and/or otherwise combined with the systems and methods disclosed in U.S. patent application Ser. No. 16/115,290, filed Aug. 28, 2018, the entire disclosure of which is incorporated by reference herein. For example, the multiple demand charge cost optimization features described above may be combined with the stochastic optimization features described in U.S. patent application Ser. No. 16/115,290 to provide an energy cost optimization system that accounts for multiple demand charges while performing stochastic optimization of energy cost. FIGS. 14-17 and the description thereof below provide details relating to systems and methods for stochastic optimization.

Figure 14:
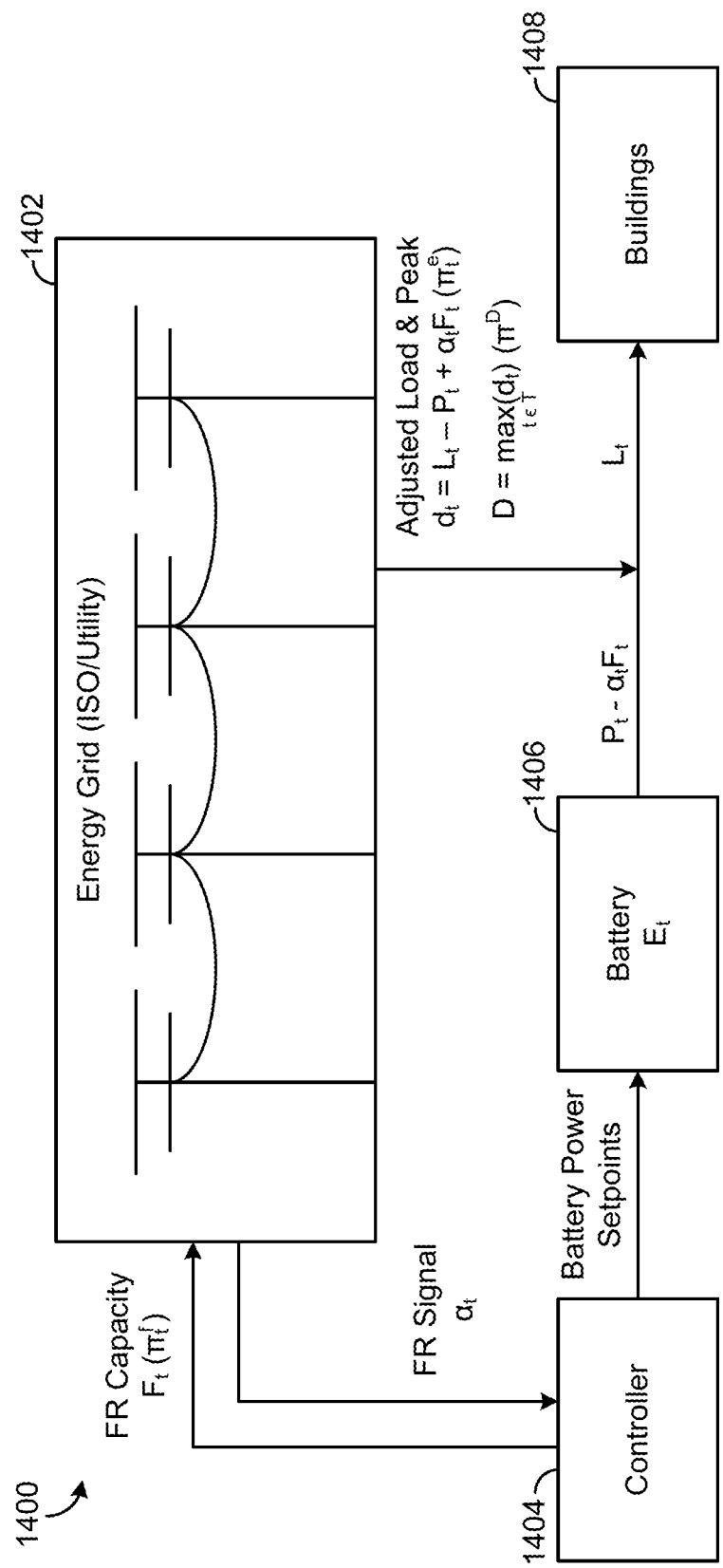
FIG. 14 is a block diagram of an energy system, according to an exemplary embodiment.
Figure 15:
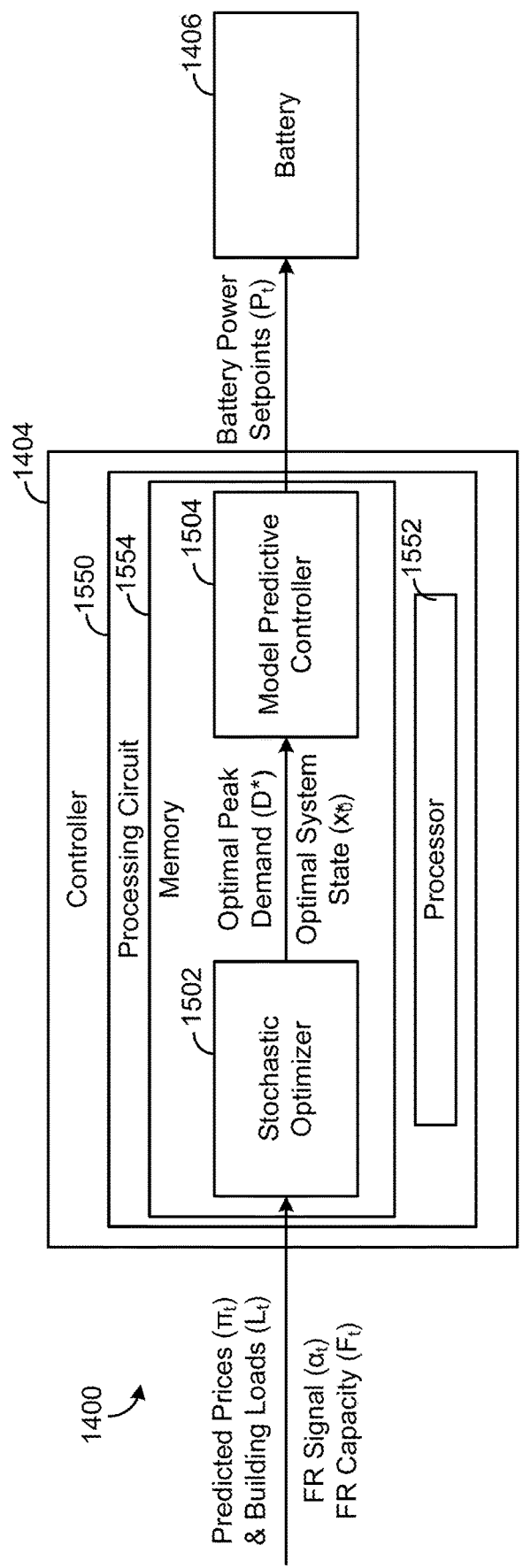
FIG. 15 is a block diagram of a controller for an energy system, according to an exemplary embodiment.

Referring now to FIGS. 14-15, a building energy system 900 is shown, according to an exemplary embodiment. System 900 may include some or all of the features of frequency response optimization system 100, photovoltaic energy system 300, energy system 500, and/or planning system 700, as described with reference to FIGS. 1-8. In some embodiments, system 900 includes some or all of the features of the building energy system described with reference to FIGS. 1-13. Although the example herein is described with reference to electrical energy and battery storage decisions, it should be understood that the systems and methods for stochastic model predictive control may be used for various allocations of assets within a central plant (e.g., steam, chilled water, hot water, etc.), including for use with the systems and methods described above with reference to FIGS. 1-13. Additionally, although the disclosure below discusses dealing with a single demand charge period, it should be understood that the systems and methods for stochastic model predictive control Building energy system 900 is shown to include an energy grid 1402, a controller 1404, a battery 1406, and one or more buildings 1408. Although system 900 is described primarily with respect to electrical energy storage in battery 1406, it should be understood that the systems and methods described herein are generally applicable to any type of energy storage. For example, battery 1406 can be replaced or supplemented with any other type of energy storage device (e.g., a thermal energy storage tank, zone mass energy storage, a thermal capacitor, etc.) and the same optimization techniques can be used to determine optimal charge/discharge rates for the energy storage device. The following paragraphs describe an example implementation in which electrical energy is stored and discharged from battery 1406 to satisfy the electrical energy load $L_t$ of buildings 1408 and to perform frequency regulation for energy grid 1402.

Energy grid 1402 may be associated with an independent system operator (ISO) and/or a power utility that provides power to buildings 1408. In some embodiments, energy grid 1402 is the same as or similar to energy grid 104, energy grid 312, and/or electric utility 511, as described with reference to FIGS. 1-5. In some embodiments, energy grid 1402 includes the functionality of incentive provider 114 and/or incentive programs 602, as described with reference to FIGS. 1 and 6. For example, energy grid 1402 can be configured to receive a frequency regulation (FR) capacity $F_t$ (e.g., a capacity bid) from controller 1404 and may provide controller 1404 with a FR signal $\alpha_t$. The FR capacity $F_t$ may specify an amount of power [kW] that controller 1404 has reserved for performing frequency regulation at time t. The FR signal $\alpha_t$ may specify a fraction of the FR capacity $F_t$ ($-1 \leq \alpha_t \leq 1$) requested by energy grid 1402 at time t. Values of $\alpha_t > 0$ indicate that energy grid 1402 sends power to system 900, whereas values of $\alpha_t > 0$ indicate that energy grid 1402 withdraws power from system 900. In some embodiments, the FR signal $\alpha_t$ is the same as the regulation signal $Reg_{signal}$ previously described.

Battery 1406 can be configured to store and discharge electric power $P_t$ [kW] to satisfy the energy load $L_t$ of buildings 1408 and to perform frequency regulation. Positive values of $P_t$ indicate that battery 1406 is discharging, whereas negative values of $P_t$ indicate that battery 1406 is charging. Battery 1406 can also receive electric power $\alpha_t F_t$ from energy grid 1402 and provide electric power $\alpha_t F_t$ to energy grid 1402 to perform frequency regulation. Positive values of $\alpha_t F_t$ indicate that system 900 is removing energy from energy grid 1402 to perform FR, whereas negative values of $\alpha_t F_t$ indicate that system 900 is providing energy to energy grid 1402 to perform FR. The net power output of battery 1406 is shown in FIG. 14 as $P_t - \alpha_t F_t$ [kW], where $P_t$ is an amount of power provided to buildings 1408 to satisfy some or all of the building load $L_t$ and $\alpha_t F_t$ is the amount of power withdrawn from energy grid 1402 for purposes of frequency regulation. The state of charge $E_t$ of battery 1406 [kWh] increases when battery 1406 is charged and decreases when battery 1406 is discharged.

The net amount of power received from energy grid 1402 at time t is shown as $d_t = L_t - P_t + \alpha_t F_t$, where $L_t$ is the electric load of buildings 1408, $P_t$ is the amount of power discharged from battery 1406 to satisfy some or all of the electric load $L_t$, and $\alpha_t F_t$ is the amount of power provided to battery 1406 from energy grid 1402 for purposes of frequency regulation. Positive values of $P_t$ indicate that battery 1406 is discharging, which subtracts from the amount of power needed to satisfy the building electric load $L_t$ and therefore reduces the total amount of power $d_t$ received from energy grid 1402 at time t. Negative values of $P_t$ indicate that battery 1406 is charging, which adds to the amount of power needed to satisfy the building electric load $L_t$ and therefore increases the amount of power received from energy grid 1402 at time t. Positive values of $\alpha_t F_t$ indicate that system 900 is removing energy from energy grid 1402 to perform FR, which increases the total amount of power $d_t$ received from energy grid 1402 at time t. Negative values of $\alpha_t F_t$ indicate that system 900 is providing energy to energy grid 1402 to perform FR, which decreases the total amount of power $d_t$ received from energy grid 1402 at time t.

The net amount of power $d_t$ received from energy grid 1402 may be subject to both an energy cost charge and a demand charge. For example, the total cost of energy over a time period T can be calculated as:

$$J = \sum_{t \in T} \pi_t^e d_t + \max_{t \in T}(d_t)\pi^D$$

where the first term represents the energy cost charge and the second term represents the demand charge. The energy cost charge may be calculated based on the total amount of energy [kWh] received from energy grid 1402 over the duration of a given time period. In some embodiments, the cost of energy $\pi_t^e$ [$/kWh] varies as a function of time t. Accordingly, the energy cost charge can be calculated for each time step t by multiplying the cost of energy $\pi_t^e$ at time t by the amount of energy received from energy grid 1402 at time t. The total energy cost charge can then be calculated by summing over all time steps. The demand charge D may be based on the maximum value of $d_t$ over the duration of a demand charge period T. In some embodiments, the demand charge D is calculated as $$D = \max_{t \in T}(d_t)\pi^D,$$

where the max( ) function selects the maximum value of $d_t$ [kW] that occurs within the demand charge period T and $\pi^D$ is the demand charge rate [$/kW].

Controller 1404 can be configured to determine optimal values for the battery power $P_t$ at each time t in order to minimize the total cost of energy J. In some embodiments, controller 1404 determines the optimal short-term participation strategies for battery 1406 in frequency regulation and energy markets while simultaneously mitigating long-term demand charges from energy grid 1402. The technical challenge is solving the associated planning problem over long horizons. To address this, controller 1404 can perform a two-stage optimization with periodicity constraints.

Controller 1404 is shown to include a processing circuit 1550 configured to control, at least partly, the controller 1404 as described herein. The controller includes a processor 1552 and a memory 1554. The processor 1552 may implemented as a general-purpose processor, an application specific integrated circuit (ASIC), one or more field programmable gate arrays (FPGAs), a digital signal processor (DSP), a group of processing components, or other suitable electronic processing components. The one or more memory devices of memory 1554 (e.g., RAM, ROM, NVRAM, Flash Memory, hard disk storage, etc.) may store data and/or computer code for facilitating at least some of the various processes described herein. In this regard, the memory 1554 may store programming logic that, when executed by the processor 1552, controls the operation of the controller 1404.

The memory 1554 includes a stochastic optimizer 1502 communicably coupled to a model predictive controller 1504. In the embodiment shown, the stochastic optimizer 1502 and the model predictive controller 1504 are implemented as data and/or computer code executable by the processor 1552 to facilitate the processes attributed thereto herein. In other embodiments, the stochastic optimizer 1502 and/or the model predictive controller 1504 may be implemented on separate processors or distributed across various computing resources (e.g., cloud-based computing). It should be understood that the stochastic optimizer 1502 and the model predictive controller 1504 are highly configurable and may be implemented using various approaches.

Stochastic optimizer 1502 can be configured to perform a first optimization to determine optimal values for first-stage (design) variables including, for example, the initial/terminal state-of-charge (SOC) $E_0^*$ of battery 1406 and/or the peak demand D* over the entire planning horizon. Model predictive controller 1504 can be configured to perform a second optimization to determine optimal values for second-stage decisions such as the battery power $P_t$ and the frequency response commitment $\alpha_t F_t$ at each time t. The second optimization may be subject to a constraint (e.g., a soft constraint) based on the peak demand D*. For example, the second optimization may ensure that the demand at any given time does not exceed the peak demand D* determined by the first optimization.

As shown in FIG. 15, controller 1404 can be configured to execute a hierarchical optimization strategy in which optimal first-stage decisions from stochastic optimizer 1502 conducting long-term planning are communicated to model predictive controller 1504. Model predictive controller 1504 can use a receding horizon MPC scheme to conduct short-term planning based on the optimal first-stage decisions. Advantageously, under nominal conditions with perfect forecast, the hierarchical optimization strategy yields the optimal policy of the long-term planning problem. Controller 1404 may also employ various strategies to guide and correct MPC schemes when perfect forecasts are not available. The operations performed by controller 1404 are described in greater detail below.

Problem Formulation

Consider a general planning formulation of the form:

$$\min_{u_t} \sum_{t \in \overline{T}} \varphi_1(x_t, u_t, d_t) + \max_{t \in T} \varphi_2(x_t, u_t, d_t) \quad (2.1a)$$

$$\text{s.t.} \quad x_{t+1} = f(x_t, u_t, d_t), t \in \overline{T} \quad (2.1b)$$

$$x_0 = x_N \quad (2.1c)$$

$$x_t \in X, u_t \in U \quad (2.1d)$$

where $T := \{0, \ldots, N\}$ and $\overline{T} = T \backslash \{N\}$ are time horizons, $\varphi 1(\bullet)$ is a time-additive cost function, and $\varphi 2(\bullet)$ is a time-max cost function. The controls (e.g., controlled system inputs), system states, and disturbances (e.g., uncontrolled system inputs) are expressed as $u_t$, $x_t$, and $d_t$ respectively. Equation (2.1c) is a periodicity constraint which specifies that the system state $x_0$ at the first time step t=0 is equal to the system state $x_N$ at the last time step t=N of the optimization period. In some embodiments, the variable $x_0$ is a free variable to be optimized.

Consider now a partition (in lexicographic order) of the time set T (and of $\overline{T}$) in to a set of time stages $\Xi = \{0, \ldots, M\}$ satisfying $T = U_{\xi \in \Xi} T_\xi$, where $T_\xi := \{0, \ldots, N_\xi\}$ are the time sets of stages $\xi \in \Xi$ and satisfy $\Sigma_{\xi \in \Xi} N_\xi = N$. For convenience, the set $\overline{\Xi}$ can be defined as $\overline{\Xi} := \Xi \backslash \{M\}$. The states, controls, and disturbance trajectories can be partitioned into stages. The partitioned trajectories can be denoted as $u_{\xi,t}$, $x_{\xi,t}$, and $d_{\xi,t}$ for $\xi \in \Xi$ and $t \in T_\xi$. In this formulation, the index $\xi$ identifies a particular stage selected from the set of stages $\xi \in \Xi$ and the index t identifies a particular time step selected from the set of time steps within the stage $t \in T_\xi$. These partitions can be used to reformulate the planning problem in the following equivalent form:

$$\max_{u_{\xi,t}} \sum_{\xi \in \Xi} \sum_{t \in \overline{T}_\xi} \varphi_1(x_{\xi,t}, u_{\xi,t}, d_{\xi,t}) + \max_{\xi \in \Xi} \max_{T \in T_\xi} \varphi_2(x_{\xi,t}, u_{\xi,t}, d_{\xi,t}) \quad (2.2a)$$

$$\text{s.t.} \quad x_{\xi,t+1} = f(x_{\xi,t}, u_{\xi,t}, d_{\xi,t}), \xi \in \Xi, t \in \overline{T}_\xi \quad (2.2b)$$

$$x_{\xi+1,0} = x_{\xi,N_\xi}, \xi \in \overline{\Xi} \quad (2.2c)$$

$$x_{M,N_M} = x_{0,0} \quad (2.2d)$$

$$x_{\xi,t} \in X, u_{\xi,t} \in U. \quad (2.2e)$$

where the constraint (2.2c) enforces continuity between stages by ensuring that the system state $x_{\xi,N_\xi}$ at the end of stage $\xi$ is equal to the system state $x_{\xi+1,0}$ at the beginning of the next stage $\xi+1$.

The planning problem can be modified by requiring periodicity to be enforced at every stage:

$$\max_{u_{\xi,t}} \sum_{\xi \in \Xi} \sum_{t \in \overline{T}_\xi} \varphi_1(x_{\xi,t}, u_{\xi,t}, d_{\xi,t}) + \max_{\xi \in \Xi} \max_{T \in T} \varphi_2(x_{\xi,t}, u_{\xi,t}, d_{\xi,t}) \quad (2.3a)$$

$$\text{s.t.} \quad x_{\xi,t+1} = f(x_{\xi,t}, u_{\xi,t}, d_{\xi,t}), \xi \in \Xi, t \in \overline{T}_\xi \quad (2.3b)$$

$$x_{\xi+1,0} = x_{\xi,N_\xi}, \xi \in \overline{\Xi} \quad (2.3c)$$

-continued $$x_{\xi,N_\xi} = x_{\xi,0}, \xi \in \Xi \quad (2.3d)$$

$$x_{\xi,t} \in X, u_{\xi,t} \in U. \quad (2.3e)$$

where (2.3d) implies (2.2d) and $x_{0,0}$ is a free variable. Moreover, the periodicity constraint (2.3d) together with the stage continuity constraints (2.3c) can be expressed as $x_{\xi+1,0}=x_{\xi,0}$, $\xi \in \Xi$. These constraints, in turn, can be reformulated as $x_{\xi,0}=x_0$, $\xi \in \Xi$ by introducing an additional variable $x_0$. Consequently, the goal of formulation (2.3) is to find the optimal periodic state $x_0$ and control policies $u_{\xi,t}$, $\xi \in \Xi$, $t \in T_\xi$ that minimize the time-additive and time-max costs.

The time-max function (i.e., the second term of equation (2.3a)) can be reformulated to yield the following equivalent form of (2.3):

$$\max_{u_{\xi,t},\eta} \sum_{\xi \in \Xi} \sum_{t \in T_\xi} \varphi_1(x_{\xi,t}, u_{\xi,t}, d_{\xi,t}) + \eta \quad (2.4a)$$

$$\text{s.t. } \varphi_2(x_{\xi,t}, u_{\xi,t}, d_{\xi,t}) \le \eta, \xi \in \Xi, t \in T_\xi \quad (2.4b)$$

$$x_{\xi,t+1} = f(x_{\xi,t}, u_{\xi,t}, d_{\xi,t}), \xi \in \Xi, t \in \overline{T}_\xi \quad (2.4c)$$

$$x_{\xi,0} = x_0, \xi \in \Xi \quad (2.4d)$$

$$x_{\xi,N_\xi} = x_0, \xi \in \Xi \quad (2.4e)$$

$$x_{\xi,t} \in X, u_{\xi,t} \in U \quad (2.4f)$$

The solution of (2.4) is denoted as $x_{\xi,t}^*$, $u_{\xi,t}^*$, $\eta^*$, where $x^*_{\xi,t}$ is the optimal trajectory of system states, $u_{\xi,t}^*$ is the optimal trajectory of controlled inputs, and $\eta^*$ is the optimal value of the time-max function (e.g., $$\eta^* = \max_{\xi \in \Xi} \max_{t \in T_\xi} \varphi_2(x_{\xi,t}^*, u_{\xi,t}^*, d_{\xi,t})).$$

Consequently, $\eta^*$ is the time-max cost over the entire planning horizon. It is also noted that $x_{\xi+1,0}^*=x_{\xi,0}^*=x_0^*$.

From the structure of (2.4) it is evident that the only coupling between stages arises from the variables $x_0$ and $\eta$. Consequently, problem (2.4) can be seen as a stochastic programming problem in which stages are scenarios, $x_0$ and $\eta$ are design variables, and the policies $x_{\xi,t}$, $u_{\xi,t}$ are scenario variables. By fixing the design variables to their optimal values $x_0^*$ and $\eta^*$, problem (2.4) can be decomposed into M subproblems of the form:

$$\max_{u_{\xi,t}} \sum_{t \in T_\xi} \varphi_1(x_{\xi,t}, u_{\xi,t}, d_{\xi,t}) + \eta^* \quad (2.5a)$$

$$\text{s.t. } \varphi_2(x_{\xi,t}, u_{\xi,t}, d_{\xi,t}) \le \eta^*, t \in T_\xi \quad (2.5b)$$

$$x_{\xi,0} = f(x_{\xi,t}, u_{\xi,t}, d_{\xi,t}), t \in \overline{T}_\xi \quad (2.5c)$$

$$x_{\xi,0} = x_0^* \quad (2.5d)$$

$$x_{\xi,N_\xi} = x_0^* \quad (2.5e)$$

$$x_{\xi,t} \in X, u_{\xi,t} \in U. \quad (2.5f)$$

The key observation is that, from the optimality of the design variables $x_{\xi,0}^*$ and $\eta^*$, the solution of the stage problem yields the optimal trajectory $u_{\xi,t}^*$ and $x_{\xi,t}^*$ (or a trajectory that achieves the same optimal stage cost). Moreover, the subproblem (2.5) has the structure of an MPC problem with periodicity constraints. The stochastic programming formulation thus suggests a hierarchical planning architecture, in which the long-term planning problem (2.4) (equivalently (2.2)) provides guidance to the short-term MPC problem. The communication arises in the form of constraints on the periodic state $x_0^*$ and the peak cost $\eta^*$.

Battery Optimization Example

The following paragraphs describe the elements of the stochastic programming formulation in the context of a battery planning problem. This example uses the building energy system 900 shown in FIG. 14. However, it should be understood that the stochastic programming formulation can be used to optimize any type of energy systems or resource allocations and is not limited to electrical energy storage in a battery 1406. The model parameters, data, and variables used in the stochastic program are described below.

The parameter $L_{\xi,t}$ denotes the energy load [kW] of buildings 1408 at time t of scenario $\xi$, where $L_{\xi,t} \in \mathbb{R}$. The parameter $\Sigma_{\xi,t}^e$ denotes the market price for electricity [$/kWh] at time t of scenario $\xi$, where $L_{\xi,t} \in \mathbb{R}$. Similarly, the parameter $\pi_{\xi,t}^f$ denotes the market price for regulation capacity [$/kW] at time t of scenario where $\pi_{\xi,t}^f \in \mathbb{R}_+$. The parameter $\pi^D$ denotes the demand charge (monthly) price [$/kW] that applies to the demand charge period over which the optimization is preformed, where $\pi^D \in \mathbb{R}_+$. The building energy load $L_{\xi,t}$ and prices $\pi_{\xi,t}^e$, $\pi_{\xi,t}^f$, and $\pi^D$ can be forecasted and provided as inputs to controller 1404.

As described above, $\alpha_{\xi,t}$ denotes the fraction of frequency regulation capacity [-] requested by energy grid 1402 at time t of scenario $\xi$. If $\alpha_t > 0$, energy grid 1402 sends a power to battery 1406. If $\alpha_t > 0$ energy grid 1402 withdraws power from battery 1406. The trajectory of $\alpha_{\xi,t}$ defines the frequency regulation (FR) signal provided by energy grid 1402. The FR signal may also be forecasted (e.g., based on historical values or scenarios for the FR signal) and provided as an input to controller 1404.

The parameter $\overline{E}$ denotes the storage capacity [kWh] of battery 1406, where $\overline{E} \in \mathbb{R}$. The parameter $\overline{P}$ denotes the maximum discharging rate (power) [kW] of battery 1406, where $\overline{P} \in \mathbb{R}$. Similarly, the parameter $\underline{P}$ denotes the maximum charging rate (power) [kW] of battery 1406, where $\underline{P} \in \mathbb{R}$. The parameter $\rho$ denotes the fraction of battery capacity reserved for frequency regulation [kWh/kW], where $\rho \in \mathbb{R}$. The parameter $\overline{\Delta P}$ denotes the maximum ramping limit [kW/h], where $\overline{\Delta P} \in \mathbb{R}$. The values of $\overline{E}$, $\overline{P}$, $\underline{P}$, $\rho$, and $\overline{\Delta P}$ can also be provided as inputs to controller 1404.

The model variables used in the stochastic program can be replicated for all scenarios $\xi \in \Xi$. The model variable $P_{\xi,t}$ denotes the net discharge rate (power) [kW] of battery 1406 at time t of scenario $\xi$, where $P_{\xi,t} \in \mathbb{R}$. Values of $P_{\xi,t} > 0$ indicate that battery 1406 is being discharged, whereas values of $P_{\xi,t} < 0$ indicate that battery 1406 is being charged. The variable $F_{\xi,t}$ denotes the frequency regulation capacity [kW] provided to energy grid 102 at time t of scenario $\xi$, where $F_{\xi,t} \in \mathbb{R}_+$. The variable $E_{\xi,t}$ denotes the state of charge of battery 1406 [kWh] at time t of scenario $\xi$, where $E_{\xi,t} \in \mathbb{R}_+$. The variable $d_{\xi,t}$ denotes the load requested from energy grid 1402 [kW] at time t of scenario $\xi$, where $d_{\xi,t} \in \mathbb{R}_+$. The variable $$D = \max_{\xi \in \Xi} \max_{t \in T_\xi} d_{\xi,t}$$

denotes the peak load [kW] over horizon T.

Stochastic Optimizer

Stochastic optimizer 1502 can be configured to perform a first optimization to determine the optimal peak demand D* and/or optimal system state $x_0$*. In the battery example, the optimal system state may be the optimal state of charge (SOC) of battery 1406. The optimal peak demand D* determined by stochastic optimizer 1502 can be passed to model predictive controller 1504 and used to constrain a second optimization performed by model predictive controller 1504. Similarly, the optimal system state $x_0$* determined by stochastic optimizer 1502 can be passed to model predictive controller 1504 and used as a periodicity constraint in the second optimization performed by model predictive controller 1504.

In some embodiments, stochastic optimizer 1502 determines the optimal peak demand D* and/or optimal system state $x_0$* by optimizing an objective function. The objective function may account for the expected revenue and costs of operating battery 1406 and may include both a time-additive cost term and a time-max cost term. For example, the objective function may have the form shown in equation (2.6):

$$\sum_{\xi \in \Xi} \sum_{t \in T_\xi} \left( \pi^e_{\xi,t}(P_{\xi,t} - \alpha_{\xi,t} F_{\xi,t}) + \pi^f_{\xi,t} F_{\xi,t} \right) - \pi^D D \qquad (2.6)$$

where the first term is a time-additive cost and the second term, together with constraint (2.12) is the time-max cost. The expression $P_{\xi,t} - \alpha_{\xi,t} F_{\xi,t}$ represents the energy savings [kWh] resulting from discharging battery 1406 at time t of scenario ξ and is multiplied by the cost of energy $\pi^e_{\xi,t}$ [$/kWh] at time t of scenario ξ to determine the energy cost savings. The variable $F_{\xi,t}$ denotes the frequency regulation capacity [kW] provided to energy grid 1402 at time t of scenario ξ and is multiplied by the market price for regulation capacity $F^f_{\xi,t}$ [$/kW] to determine the expected frequency regulation revenue. The variable D represents the peak load [kW] over the optimization horizon T and is multiplied by the demand charge price [$/kW] to determine the demand charge cost.

Stochastic optimizer 1502 can be configured to optimize objective function (2.6) subject to a set of constraints. In some embodiments, the constraints are replicated for every scenario ξ∈Ξ. Stochastic optimizer 1502 can be configured to impose a constraint that ensures the amount of power $P_{\xi,t}$ charged or discharged from battery 1406 plus the FR capacity $F_{\xi,t}$ provided to energy grid 1402 is within the maximum discharging and charging rates $\overline{P}$ and $\underline{P}$:

$$P_{\xi,t} + F_{\xi,t} \leq \overline{P}, t \in T_\xi, \xi \in \Xi \qquad (2.7a)$$

$$P_{\xi,t} - F_{\xi,t} \geq -\underline{P}, t \in T_\xi, \xi \in \Xi \qquad (2.7b)$$

Stochastic optimizer 1502 can use the following constraint to represent the storage dynamics of battery 1406:

$$E_{\xi,t+1} = E_{\xi,t} - P_{\xi,t} + \alpha_{\xi,t} F_{\xi,t}, t \in T_\xi, \xi \in \Xi \qquad (2.8)$$

where $E_{\xi,t}$ is the state of charge of battery 1406 at time t, $P_{\xi,t}$ is the amount of power discharged from battery 1406 at time t, and $\alpha_{\xi,t} F_{\xi,t}$ is the amount of power added to battery 1406 at time t as a result of performing frequency regulation.

Accordingly, constraint (2.8) ensures that the state of charge of battery 1406 at time t+1 $E_{\xi,t+1}$ accounts for all of the sources of power charged or discharged from battery 1406.

Stochastic optimizer 1502 can use the following constraint to ensure that a certain amount of energy is reserved for the committed FR capacity over the interval (t, t+1):

$$\rho F_{\xi,t} \leq E_{\xi,t} \leq \overline{E} - \rho F_{\xi,t}, t \in T_\xi, \xi \in \Xi \qquad (2.9a)$$

$$\rho F_{\xi,t} \leq E_{\xi,t+1} \leq \overline{E} - \rho F_{\xi,t}, t \in T_\xi, \xi \in \Xi \qquad (2.9b)$$

where $E_{\xi,t}$ represents the state of charge of battery 1406 at time t and is constrained between a minimum battery capacity $\rho F_{\xi,t}$ and a maximum battery capacity $\overline{E} - \rho F_{\xi,t}$. Similarly, the state of charge $E_{\xi,t+1}$ charge of battery 1406 at time t+1 can be constrained between the minimum battery capacity $\rho F_{\xi,t}$ and the maximum battery capacity $\overline{E} - \rho F_{\xi,t}$.

Stochastic optimizer 1502 can use the following constraint to constrain the battery ramp discharge rate:

$$-\overline{\Delta P} \leq F_{\xi,t+1} - F_{\xi,t} \leq \overline{\Delta P}, t \in T_\xi, \xi \in \Xi \qquad (2.10)$$

where the change in battery power $P_{\xi,t+1} - P_{\xi,t}$ between times t and t+1 is constrained between a negative ramp rate limit $-\overline{\Delta P}$ and a positive ramp rate limit $\overline{\Delta P}$.

Stochastic optimizer 1502 can use the following constraint to define the residual demand $d_k$ requested from energy grid 1402:

$$d_{\xi,t} = L_{\xi,t} - P_{\xi,t} + \alpha_{\xi,t} F_{\xi,t}, t \in T_\xi, \xi \in \Xi \qquad (2.11)$$

where $L_{\xi,t}$ is the energy load of buildings 1408, $P_{\xi,t}$ is the amount of power discharged from battery 1406, and $\alpha_{\xi,t} F_{\xi,t}$ is the amount of power withdrawn from energy grid 1402 for purposes of frequency regulation.

Stochastic optimizer 1502 can impose the following constraint to ensure that the peak demand D is at least as large each demand $d_{\xi,t}$ that occurs within the demand charge period:

$$d_{\xi,t} \leq D, t \in T_\xi, \xi \in \Xi \qquad (2.12)$$

Accordingly, the value of the peak demand D is guaranteed to be greater than or equal to the maximum value of $d_{\xi,t}$ during the demand charge period.

In some embodiments, stochastic optimizer 1502 can use the following constraint to prevent battery 1406 from selling back electricity to energy grid 1402:

$$P_{\xi,t} + F_{\xi,t} \leq L_{\xi,t}, t \in T_\xi, \xi \in \Xi \qquad (2.13)$$

which ensures that the amount of power discharged from the battery $P_{\xi,t}$ plus the amount of power $F_{\xi,t}$ withdrawn from energy grid 1402 for purposes of frequency regulation is less than or equal to the building energy load $L_{\xi,t}$.

Stochastic optimizer 1502 can enforce a non-anticipativity constraint on the initial state of charge of battery 1406 using the constraint:

$$E_{\xi,0} = E_0, \xi \in \Xi \qquad (2.14)$$

which ensures that the state of charge $E_{\xi,0}$ of battery 1406 at the beginning of scenario is equal to the initial state of charge parameter $E_0$.

Stochastic optimizer 1502 can enforce the following periodicity constraint:

$$E_{\xi,N_\xi} = E_0, \xi \in \Xi \qquad (2.16)$$

which ensures that the final state of charge $E_{\xi,N_\xi}$ of battery 1406 at the end of each scenario is the same as the initial state of charge of battery 1406 at the beginning of the scenario.

Stochastic optimizer 1502 can impose bounds on the variables using the following constraints:

$$0 \leq E_{\xi,t} \leq \overline{E}, t \in T_\xi, \xi \in \Xi \quad (2.18a)$$

$$-\underline{P} \leq P_{\xi,t} \leq \overline{P}, t \in T_\xi, \xi \in \Xi \quad (2.18b)$$

$$0 \leq F_{\xi,t} \leq \overline{P}, t \in T_\xi, \xi \in \Xi \quad (2.18c)$$

Stochastic optimizer 1502 can optimize the objective function (2.6) subject to the constraints (2.7a)-(2.18c) to obtain the optimal first-stage solution $E_0^*$ and $D^*$. These optimal values can be provided to model predictive controller 1504 and used to guide a deterministic MPC scheme that obtains the battery operating policy over short-term daily planning horizons. For example, $E_0^*$ can be used by model predictive controller 1504 as the initial state of charge to start the MPC scheme and as the periodic state of charge enforced by a terminal constraint in the MPC subproblems. $D^*$ can be used by model predictive controller 1504 to constrain the peak demand obtained from the MPC scheme over the daily planning period.

Model Predictive Controller

Model predictive controller 1504 can be configured to perform a second optimization to determine optimal battery power setpoints $P_{\xi,t}$ for battery 1406 for each time step t of each scenario $\xi$. In some embodiments, model predictive controller 1504 performs the second optimization at time $t=t_\xi$, where $t_\xi = \xi E_\xi$, $\xi \in \Xi$, over horizon $T_\xi := \{t, t+1, \ldots, t+N_\xi\}$. The second optimization performed by model predictive controller 1504 at time $t_\xi$ may use forecasts for prices and loads over the prediction horizon $T_\xi$. In the perfect information case, the forecasts used by model predictive controller 1504 match the information used to generate the scenarios of the first optimization performed by stochastic optimizer 1502. In some embodiments, model predictive controller 1504 performs a plurality of second optimizations (e.g., one at each time $t=t_\xi$ for each scenario $\xi \in \Xi$) to determine the optimal battery power setpoints $P_{\xi,t}$ at each time step of the corresponding scenario $\xi$.

Model predictive controller 1504 can implement the solution of the second optimization at time $t_\xi$ for a block of $N_\xi$ hours, where $N_\xi$ represents the frequency at which the second optimization is repeated (e.g., once per day, once every two days, once per week, etc.). In the perfect information case, the results of the second stage optimization are optimal because they correspond to a scenario subproblem of the first optimization performed by stochastic optimizer 1502. In an imperfect information case, model predictive controller 1504 can modify or adjust the results of the second stage optimization to accommodate forecast errors.

In some embodiments, model predictive controller 1504 determines the optimal battery power setpoints $P_{\xi,t}$ by optimizing an objective function. The objective function may account for the expected revenue and costs of operating battery 1406 and may include both a time-additive cost term and a time-max cost term. For example, the objective function may have the form shown in equation (2.19):

$$\sum_{t \in T_\xi} \left( \pi^e_{\xi,t}(P_{\xi,t} - \alpha_{\xi,t}F_{\xi,t}) + \pi^f_{\xi,t}F_{\xi,t} \right) - \pi^D D^*, \quad (2.19)$$

where the first term is a time-additive cost and the second term is the time-max cost. The expression $P_{\xi,t} - \alpha_{\xi,t}F_{\xi,t}$ represents the energy savings [kWh] resulting from discharging battery 1406 at time t of scenario and is multiplied by the cost of energy $\pi^e_{\xi,t}$ [\$/kWh] at time t of scenario $\xi$ to determine the energy cost savings. The variable $F_{\xi,t}$ denotes the frequency regulation capacity [kW] provided to energy grid 1402 at time t of scenario $\xi$ and is multiplied by the market price for regulation capacity $\pi^f_{\xi,t}$ [\$/kW] to determine the expected frequency regulation revenue. The variable $D^*$ represents the optimal peak load [kW] over the optimization horizon T and is multiplied by the demand charge price [\$/kW] to determine the demand charge cost. The optimal peak load $D^*$ can be provided as an input from stochastic optimizer 1502.

Model predictive controller 1504 can be configured to optimize objective function (2.19) subject to a set of constraints. The constraints on the second optimization performed by model predictive controller 1504 may be the same as or similar to the constraints on the first optimization performed by stochastic optimizer 1502. However, the constraints used by model predictive controller 1504 can be based on the forecasted signals for prices, loads and regulation signals over the prediction horizon.

Model predictive controller 1504 can be configured to impose a constraint that ensures the amount of power $P_{\xi,t}$ charged or discharged from battery 1406 plus the FR capacity $F_{\xi,t}$ provided to energy grid 1402 is within the maximum discharging and charging rates $\overline{P}$ and $\underline{P}$:

$$P_{\xi,t} + F_{\xi,t} \leq \overline{P}, t \in T_\xi \quad (2.20a)$$

$$P_{\xi,t} - F_{\xi,t} \geq -\underline{P}, t \in T_\xi \quad (2.20b)$$

Model predictive controller 1504 can use the following constraint to represent the storage dynamics of battery 1406

$$E_{\xi,t+1} = E_{\xi,t} - P_{\xi,t} + \alpha_{\xi,t}F_{\xi,t}, t \in T_\xi \quad (2.21)$$

where $E_{\xi,t}$ is the state of charge of battery 1406 at time t, $P_{\xi,t}$ is the amount of power discharged from battery 1406 at time t, and $\alpha_{\xi,t}F_{\xi,t}$ is the amount of power added to battery 1406 at time t as a result of performing frequency regulation. Accordingly, constraint (2.21) ensures that the state of charge of battery 1406 at time t+1 $E_{\xi,t+1}$ accounts for all of the sources of power charged or discharged from battery 1406.

Model predictive controller 1504 can use the following constraint to ensure that a certain amount of energy is reserved for the committed FR capacity over the interval (t, t+1):

$$\rho F_{\xi,t} \leq E_{\xi,t} \leq \overline{E} - \rho F_{\xi,t}, t \in T_\xi \quad (2.22a)$$

$$\rho F_{\xi,t} \leq E_{\xi,t+1} \leq \overline{E} - \rho F_{\xi,t}, t \in T_\xi \quad (2.22b)$$

where $E_{\xi,t}$ represents the state of charge of battery 1406 at time t and is constrained between a minimum battery capacity $\rho F_{\xi,t}$ and a maximum battery capacity $\overline{E} - \rho F_{\xi,t}$. Similarly, the state of charge $E_{\xi,t+1}$ of battery 1406 at time t+1 can be constrained between the minimum battery capacity $\rho F_{\xi,t}$ and the maximum battery capacity $\overline{E} - \rho F_{\xi,t}$.

Model predictive controller 1504 can use the following constraint to constrain the battery ramp discharge rate:

$$-\overline{\Delta P} \leq P_{\xi,t+1} - P_{\xi,t} \leq \overline{\Delta P}, t \in T_\xi \quad (2.23)$$

where the change in battery power $P_{\xi,t+1} - P_{\xi,t}$ between times t and t+1 is constrained between a negative ramp rate limit $-\overline{\Delta P}$ and a positive ramp rate limit $\overline{\Delta P}$.

Model predictive controller 1504 can use the following constraint to define the residual demand $d_{\xi,t}$ requested from energy grid 1402:

$$d_{\xi,t} = L_{\xi,t} - P_{\xi,t} + \alpha_{\xi,t}F_{\xi,t}, t \in T_\xi \quad (2.24)$$

where $L_{\xi,t}$ is the energy load of buildings 1408, $P_{\xi,t}$ is the amount of power discharged from battery 1406, and $\alpha_{\xi,t}F_{\xi,t}$ is the amount of power withdrawn from energy grid 1402 for purposes of frequency regulation.

In some embodiments, model predictive controller 1504 can use the following constraint to prevent battery 1406 from selling back electricity to energy grid 1402:

$$P_{\xi,t} + F_{\xi,t} \leq L_{\xi,t}, t \in T_\xi \quad (2.25)$$

which ensures that the amount of power discharged from the battery $P_{\xi,t}$ plus the amount of power $F_{\xi,t}$ withdrawn from energy grid 1402 for purposes of frequency regulation is less than or equal to the building energy load $L_{\xi,t}$.

Model predictive controller 1504 can use the optimal values of $D^*$ and $E_0^*$ provided by stochastic optimizer 1502 to impose the following constraints:

$$E_{\xi,N} = E_0^* \quad (2.26a)$$

$$E_{\xi,0} = E_0^* \quad (2.26b)$$

$$d_{\xi,t} \leq D^* \quad (2.26c)$$

Constraints (2.26a-b) require the state of charge of battery 1406 at the beginning $E_{\xi,0}$ and end $E_{\xi,N}$ of each scenario $\xi$ to be equal to the optimal state of charge $E_0^*$. Constraint (2.26c) requires the demand $d_{\xi,t}$ requested from energy grid 1402 to be less than or equal to the optimal peak demand $D^*$ determined by stochastic optimizer 1502.

Model predictive controller 1504 can impose bounds on the variables using the following constraints:

$$0 \leq E_{\xi,t} \leq \overline{E}_\xi, t \in T_\xi \quad (2.27a)$$

$$-\underline{P} \leq P_{\xi,t} \leq \overline{P}, t \in T_\xi \quad (2.27b)$$

$$0 \leq F_{\xi,t} \leq \overline{P}, t \in T_\xi \quad (2.27c)$$

Model predictive controller 1504 can optimize the objective function (2.19) subject to the constraints (2.20a)-(2.27c) to obtain optimal battery power setpoints $P_{\xi,t}$ at each time t of each scenario $\xi$. These optimal values can be provided to battery 1406 and used to control the amount of power charged or discharged from battery 1406 at each time t. For example, the optimal battery power setpoints can be used by a battery power inverter (e.g., power inverter 106, power inverter 308, etc.) to control the rate at which power is stored in battery 1406 or discharged from battery 1406.

Operational Control Process

Figure 16:
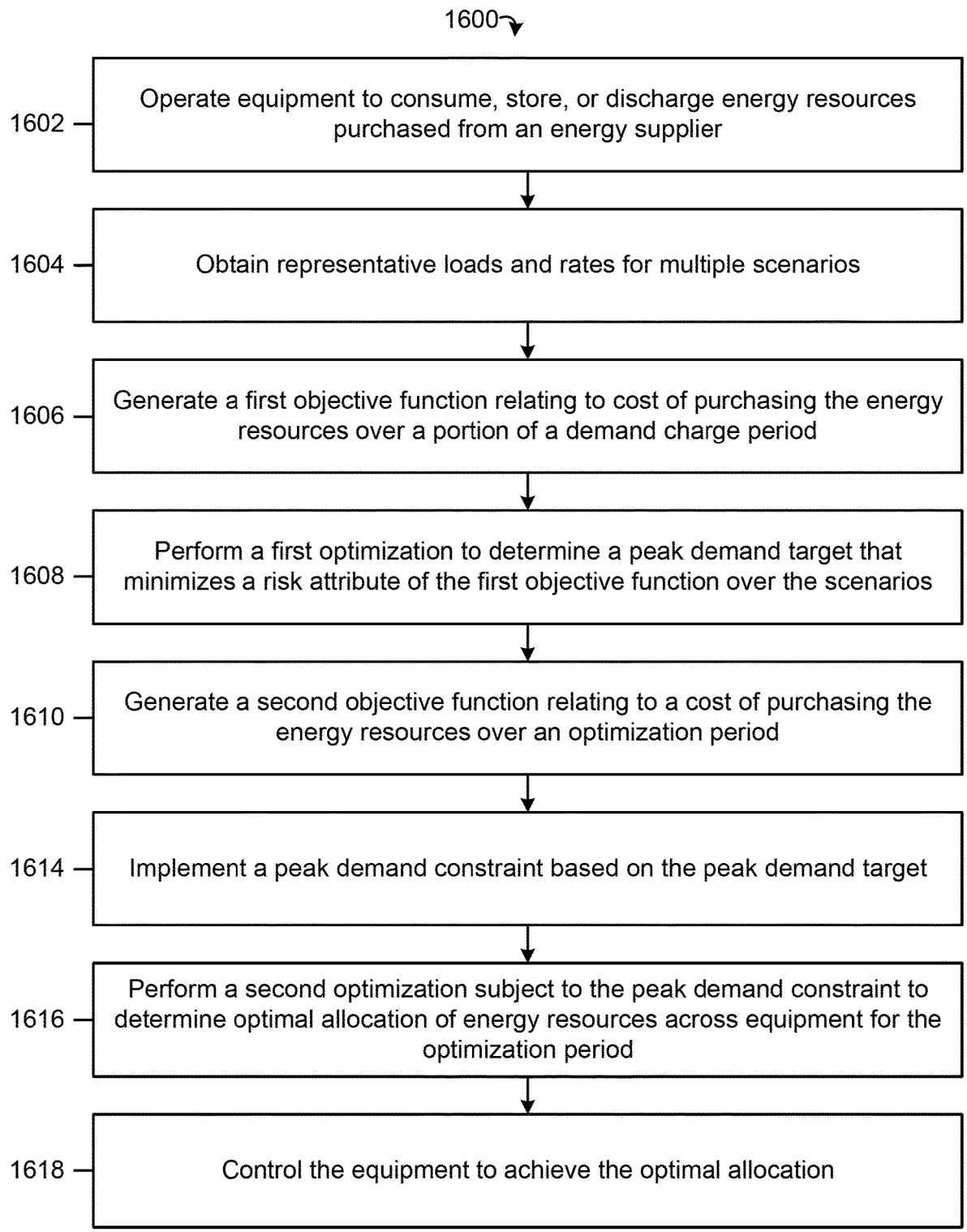
FIG. 16 is a flowchart of a process for allocating energy resources, according to an exemplary embodiment.

Referring now to FIG. 16, a flowchart of a process 1600 for online control of equipment using stochastic model predictive control with demand charge incorporation is shown, according to an exemplary embodiment. Process 1600 may be implemented using the problem formulation, variables, cost functions, constraints, etc. defined above with reference to FIGS. 14-15. Process 1600 can be executed by the controller 1404 of FIGS. 14-15 and reference is made thereto in the following description for the sake of clarity.

At step 1602, equipment is operated to consume, store, or discharge energy resources purchased from an energy supplier. The equipment may serve a building and/or a campus (e.g., a collection of buildings). At least one of the energy resources is subject to a demand charge based on a maximum demand for the corresponding energy resource during a demand charge period (e.g., one month). The equipment may include generator subplants 520, storage subplants 530 of FIG. 5, and/or various building equipment serving building 502 of FIG. 5. Accordingly, the energy resources may include electricity, water, natural gas, etc. as provided by utilities 510.

At step 1604, the stochastic optimizer 1502 obtains representative loads and rates for the building or campus for each of multiple scenarios. The stochastic optimizer 1502 may obtain the representative loads in one or more of the following ways. In some embodiments, the stochastic optimizer 1502 receives user input defining the loads and rates for several scenarios and samples the representative loads and rates from the user input. In some embodiments, the stochastic optimizer 1502 receives user input defining the loads and rates for several scenarios, estimates a mean trajectory and variance of the user-defined loads and rates to generate an estimated distribution based on the user input, and samples the representative loads and rates from the estimated distribution. In some embodiments, the stochastic optimizer 1502 receives input (e.g., from an estimation circuit, from an external computing system, etc.) defining loads and rates for several scenarios corresponding to different time periods used by a planning tool and samples the representative loads and rates from the input. In some embodiments, the stochastic optimizer 1502 stores a history of past scenarios that include actual values for historical loads and rates and samples the representative loads and rates from the history of past scenarios. In some embodiments, the stochastic optimizer 1502 stores a history of past scenarios that include actual values for historical loads and rates, estimates a mean trajectory and variance of the actual values to generate an estimated distribution based on the history, and samples the representative loads and rates from the estimated distribution. In some cases, each of the historical loads and rates corresponds to a different time period and the stochastic optimizer is configured to sample the representative loads and rates for each scenario from the historical loads and rates corresponding to a time period having similar characteristics of the scenario.

At step 1606, the stochastic optimizer 1502 generates a first objective function that includes a cost of purchasing the energy resources over a portion of the demand charge period. In some cases, the first objective function includes a frequency regulation revenue term that accounts for revenue generated by operating the equipment to participate in a frequency regulation program for an energy grid. In some cases, the first objective function may be equation (2.6) shown above or a similar equation. The first objective function may include a risk attribute, for example a conditional value at risk, a value at risk, or an expected cost.

At step 1608, the stochastic optimizer 1502 performs a first optimization to determine a peak demand target that minimizes a risk attribute of the first objective function over the scenarios. The stochastic optimizer 1502 may perform the first optimization in accordance with one or more constraints, for example as shown in equations (2.7)-(2.18c) above. For example, in some embodiments, the stochastic optimizer 1502 performs the first optimization over all of the scenarios such that one or more states of the system are constrained to have equal values at a beginning and end of the portion of the demand charge period. The stochastic optimizer 1502 thereby determines a peak demand target for the portion of the demand charge period. The stochastic optimizer 1502 may provide the peak demand target to the model predictive controller 1504.

At step 1610, the model predictive controller 1504 generates a second objective function that includes a cost of purchasing the energy resources over an optimization period (e.g., one day) within the demand charge period (e.g., one month). For example, the second objective function may be the same as or similar to equation (2.19) above.

At step 1612, the model predictive controller 1504 uses the peak demand target to implement a peak demand constraint that limits a maximum purchase of one or more energy resources subject to demand charges during the optimization period. The peak demand constraint may ensure that the peak demand target is not exceeded during the optimization period and/or apply a penalty to the second objective function when the peak demand target is exceeded. For example, the model predictive controller 1504 may implement the peak demand constraint as a soft constraint on the maximum purchase of an energy resource subject to a demand charge. The model predictive controller 1504 may also implement additional constraints, for example as shown in equations (2.20a)-(2.27c) above. For example, in an embodiment where one or more states of the system are constrained by the stochastic optimizer 1502 to have equal values at a beginning and end of the portion of the demand charge period, the model predictive controller may generate a terminal constraint based on the equal values.

At step 1616, the model predictive controller 1504 performs a second optimization subject to the peak demand constraint (and, in some cases, additional constraints) to determine the optimal allocation of the energy resources across the equipment over the optimization period. For example, the model predictive controller 1504 may determine an allocation of the energy resources that minimizes the second cost function over the optimization period. In some cases, the model predictive controller 1504 performs the second optimization multiple times for each of multiple scenarios to determine the optimal allocation of the energy resources for each scenario. In such a case, the same peak demand may be used to constrain each of the second optimizations.

The controller 1404 thereby determines an optimal allocation of energy resources for an optimization period. At step 1618, the controller 1404 controls the equipment to achieve the optimal allocation. For example, the controller 1404 may generator subplants 520 to consume and/or generate energy resources, storage subplants 530 to store and/or discharge energy resources, and control various building equipment of building 502 to alter the load of the building 502 to achieve the optimal allocation for the optimization period.

In some embodiments, steps 1610-1618 may be repeated for multiple sequential optimization periods within a demand charge period (e.g., each day in a month), i.e., such that the steps 1604-1608 are performed once for the demand charge period and steps 1610-1618 are repeated for each optimization period. In such cases, the peak demand constraint remains the same over the demand charge period. In other embodiments, process 1600 is repeated in its entirety for each sequential optimization period, such that the peak demand constraint updated before the optimal allocation for the next optimization period is determined.

Stochastic Planning Process with Demand Charge Incorporation

Figure 17:
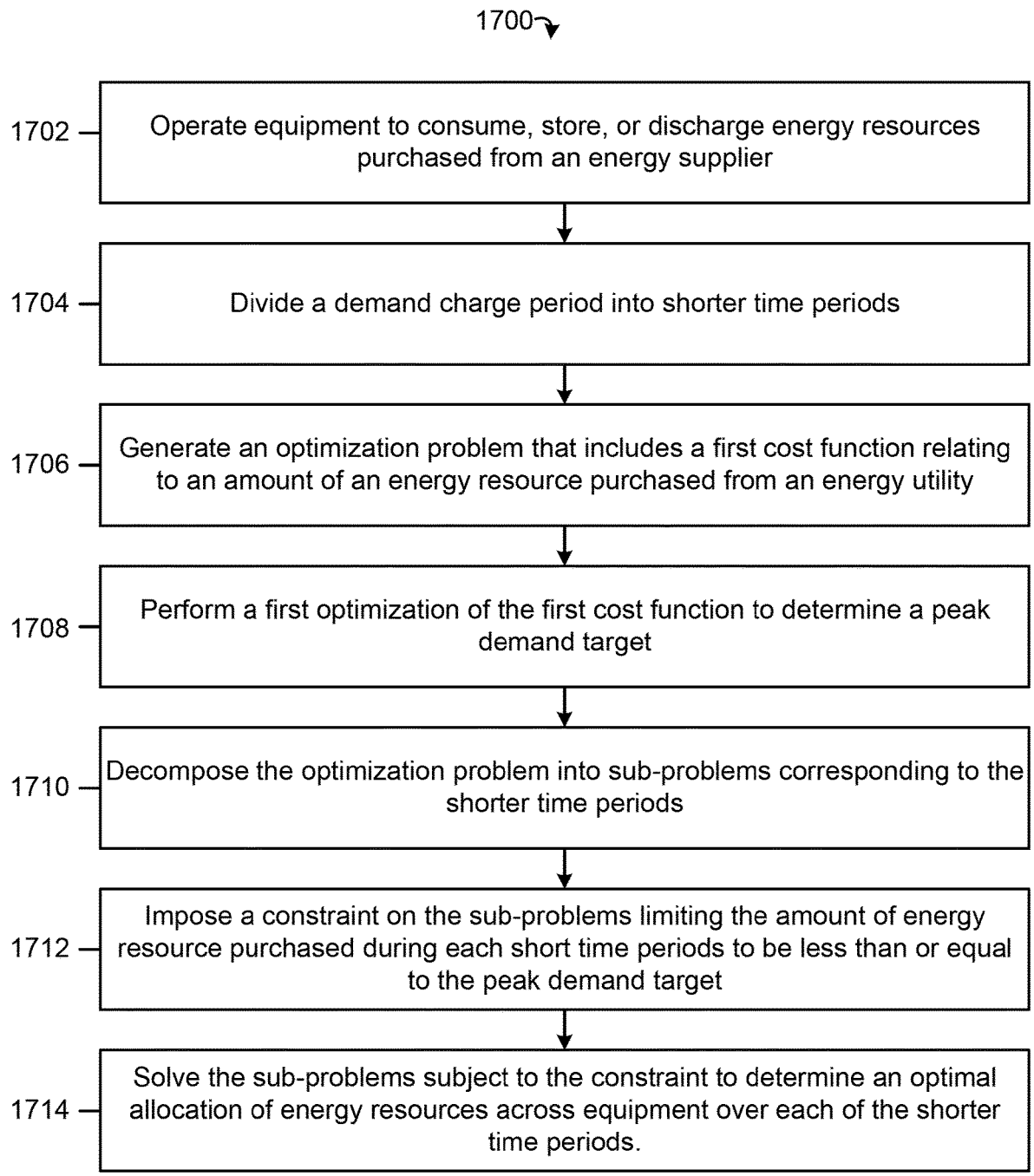
FIG. 17 is a flowchart of a process for allocating energy resources, according to an exemplary embodiment.

Referring now to FIG. 17, a process 1700 for planning resource allocation using stochastic model predictive control with demand charge incorporation is shown, according to an exemplary embodiment. Process 1700 may be implemented using the problem formulation, variables, cost functions, constraints, etc. described above with reference to FIGS. 14-15. Process 1700 can be executed by the controller 1404, and reference is made thereto in following description for the sake of clarity.

At step 1702, equipment is operated to consume, store, or discharge energy resources purchased from an energy supplier. The equipment may serve a building and/or a campus (e.g., a collection of buildings). At least one of the energy resources is subject to a demand charge based on a maximum demand for the corresponding energy resource during a demand charge period (e.g., one month). The equipment may include generator subplants 520, storage subplants 530 of FIG. 5, and/or various building equipment serving building 502 of FIG. 5. Accordingly, the energy resources may include electricity, water, natural gas, etc. as provided by utilities 510.

At step 1704, the controller 1404 divides the demand charge period into multiple shorter time periods. For example, in some cases the demand charge period may be one month and each shorter time period may be one day. As described in detail with reference to the remainder of the steps of process 1700, the controller 1404 conducts a first optimization over the demand charge period and second optimizations for each of the multiple shorter time periods.

At step 1706, the controller 1404 generates an optimization problem using a first cost function that includes a cost associated with the demand charge period as a sum of costs associated with each of the shorter time periods. The costs associated with the shorter time periods may be functions of one or more optimization variables that include an amount of an energy resource purchased from an energy utility subject to a demand charge. The first cost function may also include a demand charge term that defines a demand charge based on a maximum amount of an energy resources purchased from the energy utility during the demand charge period.

At step 1708, the controller 1404 performs a first optimization of the first cost function to determine a peak demand target. The peak demand target may then be passed to a second optimization, described below.

At step 1710, the controller 1404 decomposes the optimization problem into multiple sub-problems that each correspond to one of the shorter time periods. Each sub-problem includes a second cost function that defines the cost associated with the corresponding shorter time period as a function of the one or more optimization variables.

At step 1712, the controller 1404 imposes a constraint on the sub-problems that limits the amount of the energy resource purchased from the utility during each of the shorter time periods to be less than or equal to a peak demand target. That is, the constraint prevents the peak demand target from being exceeded during each of the shorter time periods. In some embodiments, the controller 1404 imposes one or more additional constraints. For example, the controller 1404 may impose a second constraint on each of the sub-problems that constrains a state of energy storage at an end of each of the shorter time periods to be equal to a predetermined storage state value.

At step 1714, the controller 1404 solves the multiple sub-problems subject to the one or more constraints to determine the optimal allocation of the energy resource across the equipment over each of the shorter time periods. In cases where the shorter time periods combine sequentially to form the entire demand charge period, the controller 1404 may thereby determine an optimal allocation for the demand charge period (i.e., the combination of the optimal allocations for the shorter time periods).

In some embodiments, the optimal allocations are generated for planning purposes, and may be provided to a user on a graphical user interface or applied to generate further metrics, plans, budgets, strategies etc. by a planning tool. In some embodiments, the optimal allocations are used to control the equipment during the demand charge period to achieve the optimal allocation for each shorter time period during the corresponding shorter time period. Various other applications and uses of the optimal allocations of energy resources are also possible.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building energy system configured to serve energy loads of a building or campus, the system comprising:
    equipment configured to consume, produce, store, or discharge one or more energy resources, at least one of the energy resources purchased from a utility supplier;
    a controller configured to:
        obtain representative loads and rates for the building or campus for each of a plurality of scenarios;
        generate a cost function comprising a risk attribute and multiple demand charges, each of the demand charges corresponding to a demand charge period and defining a cost based on a maximum amount of at least one of the energy resources purchased from the utility supplier during any time step within the corresponding demand charge period;
        determine, for each of the multiple demand charges, a peak demand target for the corresponding demand charge period by performing a first optimization of the risk attribute over the plurality of the scenarios;
        allocate, to each of a plurality of time steps within an optimization period, an amount of the one or more energy resources to be consumed, produced, stored, or discharged by the equipment by performing a second optimization of the cost function over the optimization period subject to one or more constraints based on the peak demand target for each of the multiple demand charges; and
        operate the equipment to consume, produce, store, or discharge the one or more energy resources at each of the plurality of time steps in accordance with a result of the second optimization.

2. The building energy system of claim 1, wherein the controller is configured to modify the cost function by applying a demand charge mask to each of the multiple demand charges, wherein demand charge masks cause the controller to disregard a resource purchased from the utility supplier during any time steps that occur outside the corresponding demand charge period when calculating a value for a demand charge.

3. The building energy system of claim 1, wherein the risk attribute of the cost function comprises at least one of a conditional value at risk, a value at risk, or an expected cost.

4. The building energy system of claim 1, wherein performing the second optimization comprises using each peak demand target to implement a peak demand constraint that limits a maximum purchase of an energy resource subject to a demand charge during a corresponding demand period.

5. The building energy system of claim 1, wherein the cost function comprises a revenue term that accounts for revenue generated by operating the equipment to participate in an incentive-based demand response program.

6. The building energy system of claim 1, wherein the controller is configured to obtain the representative loads and rates by:
    receiving user input defining the loads and rates for several scenarios; and
    at least one of:
        sampling the representative loads and rates from the user input defining the loads and rates for the several scenarios; or
        generating an estimated distribution based on the user input and sampling the representative loads and rates from the estimated distribution.

7. The building energy system of claim 1, wherein the controller is configured to obtain the representative loads and rates by:
    receiving input defining loads and rates for several scenarios, each of the scenarios corresponding to a different time period used by a planning tool; and
    sampling the representative loads and rates for each scenario from the loads and rates for a corresponding time period used by the planning tool.

8. The building energy system of claim 1, wherein the controller is configured to obtain the representative loads and rates by:

storing a history of past scenarios comprising actual values for historical loads and rates; and
at least one of:
sampling the representative loads and rates from the history of past scenarios; or
generating an estimated distribution based on the history of past scenarios and sampling the representative loads and rates from the estimated distribution.

9. The building energy system of claim 8, wherein:
each of the historical loads and rates corresponds to different time period; and
the controller is configured to sample the representative loads and rates for each scenario from the historical loads and rates corresponding to a time period having similar characteristics as the scenario.

10. The building energy system of claim 1, wherein the cost function comprises a nonlinear maximum value function for each of the multiple demand charges and the controller is configured to linearize the cost function by replacing each nonlinear maximum value function with an auxiliary demand charge variable.

11. The building energy system of claim 1, wherein the controller is configured to apply a weighting factor to each of the multiple demand charges in the cost function, each weighting factor scaling a corresponding demand charge to the optimization period.

12. The building energy system of claim 11, wherein the controller is configured to calculate each weighting factor by:
determining a first number of time steps that occur within both the optimization period and the corresponding demand charge period;
determining a second number of time steps that occur within the corresponding demand charge period but not within the optimization period; and
calculating a ratio of the first number of time steps to the second number of time steps.

13. A method for managing a building energy system, comprising:
operating equipment to consume, store, or discharge one or more energy resources purchased from a utility supplier;
determining an allocation of the energy resources across the equipment over an optimization period by:
obtaining representative loads and rates for a building or campus for each of a plurality of scenarios;
generating a cost function comprising a risk attribute and multiple demand charges, each of the demand charges corresponding to a demand charge period and defining a cost based on a maximum amount of the at least one energy resource purchased from the utility supplier during any time step within the corresponding demand charge period;
determining, for each of the multiple demand charges, a peak demand target for the corresponding demand charge period by performing a first optimization of the risk attribute over the plurality of scenarios; and
allocating, to each of a plurality of time steps within the optimization period, an amount of the one or more energy resources to be consumed, produced, stored, or discharged by the equipment by performing a second optimization of the cost function over the optimization period subject to one or more constraints based on the peak demand target for each of the multiple demand charges; and
controlling the equipment to store or discharge the amount of the one or more energy resources allocated for a current time step of the plurality of time steps.

14. The method of claim 13, comprising modifying the cost function by applying a demand charge mask to each of the multiple demand charges, wherein demand charge masks cause a controller to disregard a resource purchased from the utility supplier during any time steps that occur outside the corresponding demand charge period when calculating a value for the demand charges.

15. The method of claim 13, wherein the risk attribute of the cost function comprises at least one of a conditional value at risk, a value at risk, or an expected cost.

16. The method of claim 13, wherein optimizing the cost function comprises using each peak demand target to implement a peak demand constraint that limits a maximum purchase of an energy resource subject to a demand charge during a corresponding demand period.

17. The method of claim 13, wherein obtaining the representative loads and rates comprises:
receiving user input defining the loads and rates for several scenarios; and
at least one of:
sampling the representative loads and rates from the user input defining the loads and rates for the several scenarios; or
generating an estimated distribution based on the user input and sampling the representative loads and rates from the estimated distribution.

18. The method of claim 13, wherein obtaining the representative loads and rates comprises:
receiving input defining loads and rates for several scenarios, each of the scenarios corresponding to a different time period used by a planning tool; and
sampling the representative loads and rates for each scenario from the loads and rates for a corresponding time period used by the planning tool.

19. The method of claim 13, wherein obtaining the representative loads and rates comprises:
storing a history of past scenarios comprising actual values for historical loads and rates; and
at least one of:
sampling the representative loads and rates from the history of past scenarios; or
generating an estimated distribution based on the history of past scenarios and sampling the representative loads and rates from the estimated distribution.

20. The method of claim 19, wherein:
each of the historical loads and rates corresponds to different time period; and
the method includes sampling the representative loads and rates for each scenario from the historical loads and rates corresponding to a time period having similar characteristics as the scenario.

* * * * *